(12) United States Patent
Ng et al.

(10) Patent No.: US 9,765,168 B2
(45) Date of Patent: *Sep. 19, 2017

(54) FLAME RETARDANT VINYL ADDITION POLYCYCLOOLEFINIC POLYMERS

(71) Applicant: PROMERUS, LLC, Brecksville, OH (US)

(72) Inventors: Hendra Ng, Brecksville, OH (US); Keitaro Seto, Brecksville, OH (US); Wei Zhang, Brecksville, OH (US)

(73) Assignee: PROMERUS, LLC, Brecksville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,249

(22) Filed: Mar. 31, 2016

(65) Prior Publication Data
US 2016/0289371 A1    Oct. 6, 2016

Related U.S. Application Data

(60) Provisional application No. 62/140,600, filed on Mar. 31, 2015.

(51) Int. Cl.
*C08G 61/02* (2006.01)
*C08F 232/08* (2006.01)

(52) U.S. Cl.
CPC .................................. *C08F 232/08* (2013.01)

(58) Field of Classification Search
None
See application file for complete search history.

(56) References Cited

U.S. PATENT DOCUMENTS

| 5,972,811 | A | 10/1999 | St. Lawrence |
| 7,255,925 | B2 | 8/2007 | Chung et al. |
| 7,674,847 | B2 * | 3/2010 | Rhodes ............ C08F 2/38 |
| | | | 524/171 |
| 2012/0041137 | A1 | 2/2012 | Musa et al. |

OTHER PUBLICATIONS

K. Mizuno, et al., "The Effect of Molecular Weight on the Combustion of Paraffin and Polyethylene," Kobunshi Ronbunshu, 65, 171-177 (2008).
K. Takeda, et al., "Structure of Natural Macromolecule from the Viewpoint of Flammability," Sogou Kougaku, 22, 101-107 (2010).

* cited by examiner

*Primary Examiner* — Catherine S Branch
(74) *Attorney, Agent, or Firm* — Balaram Gupta

(57) ABSTRACT

The present invention relates to certain vinyl addition polymers encompassing polycycloolefinic monomers and a certain of olefinic monomers having thermally labile functional group. More specifically, the present invention relates to vinyl addition polymers under mass polymerization conditions of a series of functionalized norbornene-type monomers and at least one other olefinic monomer containing a thermally labile functional group such as, ether, acetal, ester, and the like. This invention also relates to reaction compositions containing a series of functionalized norbornene-type monomers and at least one other olefinic monomer containing a thermally labile functional group such as, ether, acetal, ester, and the like, which undergo vinyl addition polymerization to produce materials which are useful as flame retardant materials having a variety of applications.

22 Claims, 4 Drawing Sheets

FLAME RETARDANT VINYL ADDITION POLYCYCLOOLEFINIC POLYMERS

CROSS REFERENCE TO RELATED APPLICATIONS

This application claims the benefit of U.S. Provisional Application No. 62/140,600, filed Mar. 31, 2015, which is incorporated herein by reference in its entirety.

BACKGROUND OF THE INVENTION

Field of the Invention

The present invention relates to flame retardant materials derived from certain polycycloolefinic monomers which are polymerized under mass vinyl addition polymerization method. More specifically, the present invention relates to vinyl addition polymers formed from polycycloolefinic monomers in the presence of a chain transfer agent and a series of functionalized thermally labile olefin monomers under mass polymerization conditions.

Description of the Art

Various forms of polycyclic olefin polymers, which are formed by the vinyl addition polymerization methods have been reported in the literature. The polycycloolefinic polymers formed by the vinyl addition method find a variety of applications including as structural polymers as well as functional polymers having applications in electronic and optoelectronic materials, among others. Specific examples of such polycycloolefinic polymers include a variety of polymers derived from various functionalized norbornene type monomers.

A particular feature of polynorbornene (PNB) polymers is that they generally feature high temperature stability and are known for their high glass transition temperatures ($T_g$). In addition, various PNBs also exhibit low dielectric property and low moisture absorption. These unique properties make PNBs suitable for high frequency circuit board application. A particularly unique feature of PNBs is that they exhibit low dielectric loss property at high frequency. For instance, mass polymerized poly-hexyl norbornene (p-HexNB) has been demonstrated to show excellent dielectric property (dissipation factor <0.001 at 50 GHz) for high frequency circuit board application. However, many of the PNBs reported in literature to date exhibit a very poor flame retardant (FR) property, thus making currently available PNBs less attractive to use in certain electronic and optoelectronic applications.

In addition, there are no known compatible external FR additives that can be used to improve currently available PNBs flame retardancy. More particularly, addition of halogenated additives poses environmental issue. See for example U.S. Pat. No. 5,972,811, which discloses use of brominated flame retardant materials. Similarly, U.S. Pat. No. 7,255,925 B2 discloses certain other brominated compounds.

Various other know FR compounds, including phosphorus, nitrogen (azo), aluminum and magnesium hydroxide, contain polar moieties. Thus, addition of such polar FR compounds increases the dielectric loss property and are less attractive for the aforementioned electronic and optoelectronic applications, among others.

Accordingly, an objective of this invention is to provide flame retardant polynorbornene polymeric materials by selectively polymerizing a variety of polycycloolefinic monomers in combination with other olefinic monomers having unique thermally labile functional groups in the presence of a suitable chain transfer agent under mass vinyl addition polymerization conditions.

It is also an object of this invention to provide compositions to form controlled molecular weight polymers by mass vinyl addition polymerization techniques as disclosed herein.

Other objects and further scope of the applicability of the present invention will become apparent from the detailed description that follows.

SUMMARY OF THE INVENTION

Surprisingly, it has now been found that certain of the polycycloolefinic monomers in combination with a series of olefinic monomers having one or more thermally labile functional group when polymerized under mass vinyl addition polymerization conditions in the presence of a chain transfer agent provides polymers having unique flame retardant properties among others. Accordingly, by practice of this invention it is now possible to make polymeric materials which are inherently flame retardant and exhibit such properties without any additional flame retardant additive. Even more importantly the polymers of this invention are expected to have no adverse environmental and health issues and are environmentally safe materials having utility as flame retardant materials among various other utilities.

As it becomes apparent from the disclosures below a vinyl addition polymer made in accordance of this invention utilizing a chain transfer agent and a monomer having a labile functional group surprisingly improves the flame retardancy of the polymers made therefrom. The polymer of this invention generally exhibits a higher glass transition temperature ($T_g$) when compared with the corresponding ring open metathesis polymerized polymers formed from the respective monomers, hence providing a more thermally stable polymer backbone for enhancing flame retardancy property.

Accordingly, there is provided a vinyl addition polymer encompassing one or more first type of repeating units represented by formula (IA), said first type of repeating unit is derived from a monomer of formula (I):

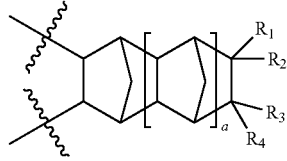

(IA)

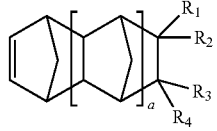

(I)

wherein:

〜 denotes a place of bonding with another repeat unit;

a is an integer 0, 1 or 2;

$R_1$, $R_2$, $R_3$ and $R_4$ are the same or different and each independently of one another is selected from hydrogen, linear or branched ($C_1$-$C_{16}$)alkyl, hydroxy($C_1$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, perfluoro($C_6$-$C_{10}$)aryl, perfluoro($C_6$-$C_{10}$)aryl ($C_1$-$C_3$)alkyl, di($C_1$-$C_2$)alkylmaleimide($C_3$-$C_6$)alkyl, di($C_1$-$C_2$)alkylmaleimide($C_2$-$C_6$)alkoxy($C_1$-$C_2$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_5$-$C_{10}$)heteroaryloxy($C_1$-$C_3$)alkyl, ($C_6$-$C_{10}$)aryloxy, ($C_5$-$C_{10}$)heteroaryloxy, ($C_1$-$C_6$)acyloxy, where each of the aforementioned substituents are optionally substituted with a group selected from halogen or hydroxy; and at least one second type of repeat unit derived from one of the monomers selected from the group consisting of:

a monomer of formula (II):

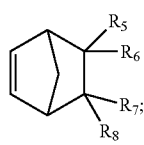

(II)

wherein:

at least one of $R_5$, $R_6$, $R_7$ and $R_8$ independently represents a group of formula (A):

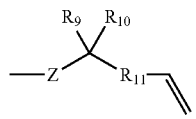

(A)

wherein:

Z is selected from —CO—O—, —O—CO— and —O—CO—O—;

$R_9$ and $R_{10}$ are the same or different and each independently of one another is selected from linear or branched ($C_1$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_4$)tricycloalkyl, ($C_6$-$C_{10}$)aryl, ($C_6$-$C_{10}$)aryl($C_1$-$C_3$)alkyl, perfluoro($C_6$-$C_{10}$)aryl and perfluoro($C_6$-$C_{10}$)aryl($C_1$-$C_3$)alkyl;

$R_{11}$ is selected from substituted or unsubstituted ($C_1$-$C_6$) alkylene, ($C_6$-$C_{10}$)arylene ($C_6$-$C_{10}$)aryl($C_2$-$C_6$)alkylene and ($C_2$-$C_6$)alkyl($C_6$-$C_{10}$)arylene;

remaining one or more of $R_5$, $R_6$, $R_7$ and $R_8$ independently represents hydrogen, linear or branched ($C_1$-$C_{12}$)alkyl, hydroxy($C_1$-$C_{12}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, perfluoro($C_6$-$C_{10}$)aryl, perfluoro($C_6$-$C_{10}$)aryl($C_1$-$C_3$)alkyl, ($C_5$-$C_{10}$)heteroaryl, ($C_5$-$C_{10}$)heteroaryl($C_1$-$C_3$)alkyl, hydroxy, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_5$-$C_{10}$)heteroaryloxy($C_1$-$C_3$)alkyl, ($C_6$-$C_{10}$)aryloxy, ($C_5$-$C_{10}$)heteroaryloxy, ($C_1$-$C_6$)acyloxy and halogen;

a monomer of formula (III):

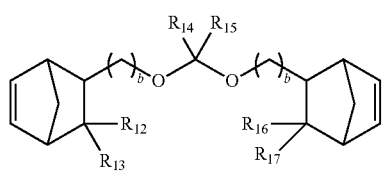

(III)

wherein:

b is an integer from 2 to 6;

$R_{12}$, $R_{13}$, $R_{16}$ and $R_{17}$ are the same or different and each independently of one another is selected from hydrogen, linear or branched ($C_1$-$C_{16}$)alkyl, hydroxy($C_1$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, perfluoro($C_6$-$C_{10}$)aryl, perfluoro($C_6$-$C_{10}$)aryl($C_1$-$C_3$)alkyl, di($C_1$-$C_2$)alkylmaleimide($C_3$-$C_6$)alkyl, di($C_1$-$C_2$)alkylmaleimide($C_2$-$C_6$)alkoxy($C_1$-$C_2$)alkyl, hydroxy, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$) alkyl, ($C_5$-$C_{10}$)heteroaryloxy($C_1$-$C_3$)alkyl, ($C_6$-$C_{10}$)aryloxy, ($C_5$-$C_{10}$)heteroaryloxy, ($C_1$-$C_6$)acyloxy, where each of the aforementioned substituents are optionally substituted with a group selected from halogen or hydroxy; and $R_{14}$ and $R_{15}$ are the same or different and each independently of one another is selected from linear or branched ($C_1$-$C_{16}$) alkyl, perfluoro($C_1$-$C_{12}$)alkyl, ($C_3$-$C_{12}$)cycloalkyl, ($C_6$-$C_{12}$) bicycloalkyl, ($C_7$-$C_{14}$)tricycloalkyl, ($C_6$-$C_{10}$)aryl, ($C_6$-$C_{10}$) aryl($C_1$-$C_3$)alkyl, perfluoro($C_6$-$C_{10}$)aryl and perfluoro($C_6$-$C_{10}$)aryl($C_1$-$C_3$)alkyl;

a monomer of formula (IV):

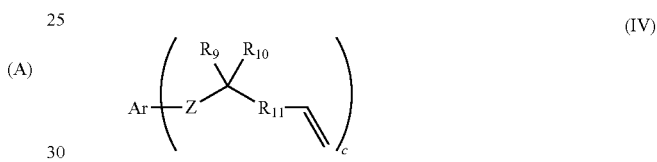

(IV)

wherein:

c is an integer from 2 to 6;

Ar is ($C_6$-$C_{10}$)aryl; and

Z, $R_9$, $R_{10}$ and $R_{11}$ are as defined above.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION

Figure 1:
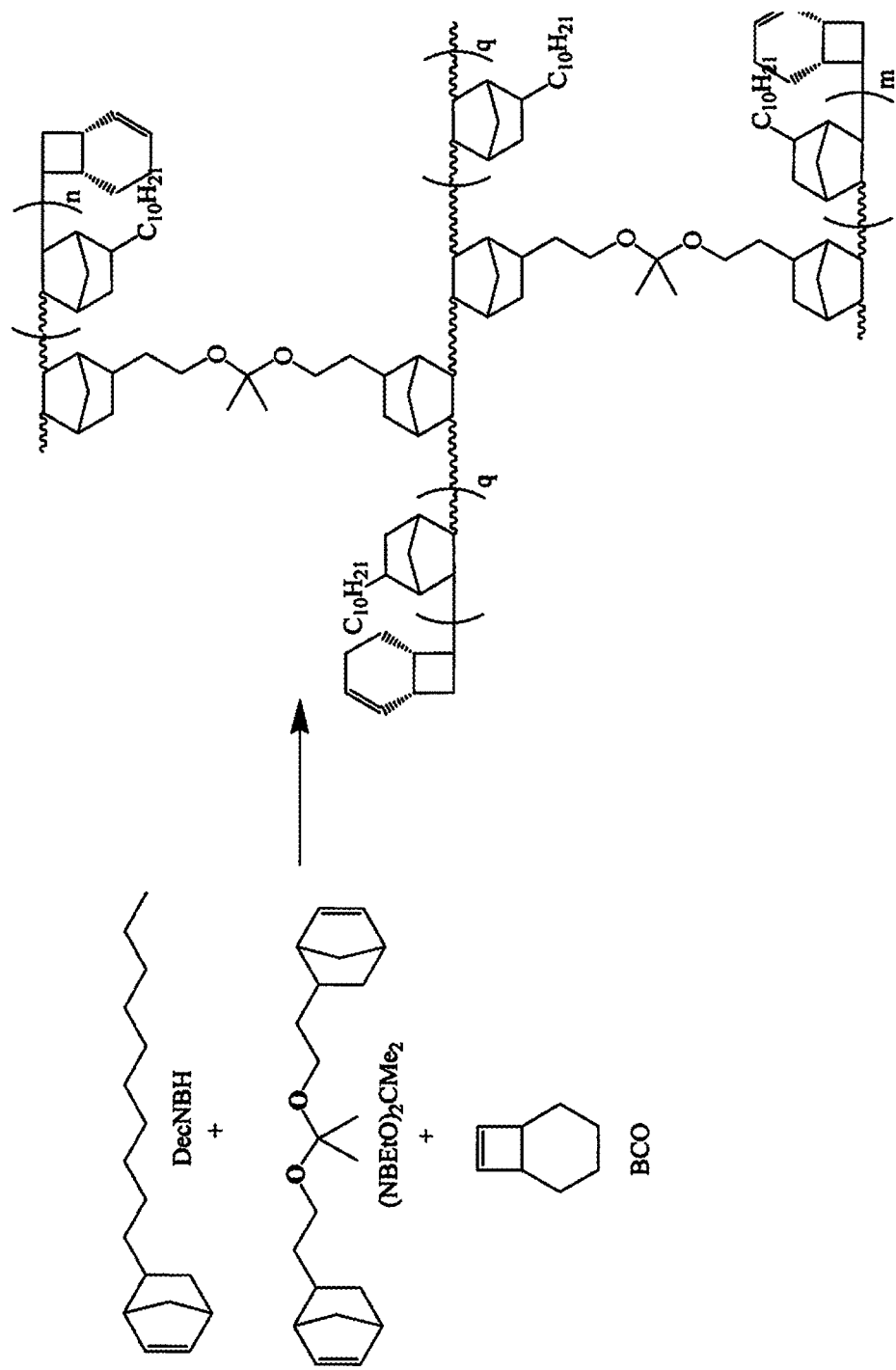
FIG. 1 shows one of the polymer embodiments of the invention formed by the mass vinyl addition polymerization of DecNB and (NBEtO)$_2$CMe$_2$.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "⌇⌇⌇." denotes a position at which the bonding takes place with another repeat unit or another atom or molecule or group or moiety as appropriate with the structure of the group as shown.

As used herein, "hydrocarbyl" refers to a radical of a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "$(C_1-C_6)$alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "$(C_1-C_4)$alkoxy", "$(C_1-C_4)$thioalkyl" "$(C_1-C_4)$alkoxy$(C_1-C_4)$alkyl", "hydroxy$(C_1-C_4)$alkyl", "$(C_1-C_4)$alkylcarbonyl", "$(C_1-C_4)$alkoxycarbonyl$(C_1-C_4)$alkyl", "$(C_1-C_4)$alkoxycarbonyl", "amino$(C_1-C_4)$alkyl", "$(C_1-C_4)$alkylamino", "$(C_1-C_4)$alkylcarbamoyl$(C_1-C_4)$alkyl", "$(C_1-C_4)$dialkylcarbamoyl$(C_1-C_4)$alkyl" "mono- or di-$(C_1-C_4)$alkylamino$(C_1-C_4)$alkyl", "amino$(C_1-C_4)$alkylcarbonyl" "diphenyl$(C_1-C_4)$alkyl", "phenyl$(C_1-C_4)$alkyl", "phenylcarboyl$(C_1-C_4)$alkyl" and "phenoxy$(C_1-C_4)$alkyl" are to be construed accordingly.

As used herein, the expression "cycloalkyl" includes all of the known cyclic radicals. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_2-C_6)$alkenyl" includes ethenyl and straight-chained or branched propenyl, butenyl, pentenyl and hexenyl groups. Similarly, the expression "$(C_2-C_6)$alkynyl" includes ethynyl and propynyl, and straight-chained or branched butynyl, pentynyl and hexynyl groups.

As used herein the expression "$(C_1-C_4)$acyl" shall have the same meaning as "$(C_1-C_4)$alkanoyl", which can also be represented structurally as "R—CO—," where R is a $(C_1-C_3)$alkyl as defined herein. Additionally, "$(C_1-C_3)$alkylcarbonyl" shall mean same as $(C_1-C_4)$acyl. Specifically, "$(C_1-C_4)$acyl" shall mean formyl, acetyl or ethanoyl, propanoyl, n-butanoyl, etc. Derived expressions such as "$(C_1-C_4)$acyloxy" and "$(C_1-C_4)$acyloxyalkyl" are to be construed accordingly.

As used herein, the expression "$(C_1-C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1-C_6)$perfluoroalkoxy", is to be construed accordingly.

As used herein, the expression "$(C_6-C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art. Derived expression, "$(C_6-C_{10})$arylsulfonyl," is to be construed accordingly.

As used herein, the expression "$(C_6-C_{10})$aryl$(C_1-C_4)$alkyl" means that the $(C_6-C_{10})$aryl as defined herein is further attached to $(C_1-C_4)$alkyl as defined herein. Representative examples include benzyl, phenylethyl, 2-phenylpropyl, 1-naphthylmethyl, 2-naphthylmethyl and the like. It should be further noted that the expressions "arylalkyl" and "aralkyl" mean the same are used interchangeably. Accordingly, the expression "$(C_6-C_{10})$aryl$(C_1-C_4)$alkyl" can also be construed as "$(C_6-C_{14})$aralkyl."

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $C_{1-6}$ alkyl, $C_{2-6}$alkenyl, $C_{1-6}$perfluoroalkyl, phenyl, hydroxy, —$CO_2H$, an ester, an amide, $C_1$-$C_6$alkoxy, $C_1$-$C_6$thioalkyl, $C_1$-$C_6$perfluoroalkoxy, —$NH_2$, Cl, Br, I, F, —NH-lower alkyl, and —N(lower alkyl)$_2$. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

As used herein "mass addition polymerization" means polymerizing one or more olefinic monomers neat without any solvent. It also includes other terms used in the art such as "bulk" polymerization or "in-mold" polymerization, and the like, in each of such methods no solvent is employed. However, the initiator/catalyst can be dissolved in some other solvent and/or in the monomer itself to initiate such "mass addition polymerization" methods as described herein.

As used herein "telechelic polymer" means a polymer having one or more reactive end groups which is available for reacting with another reactant.

As used herein "flame retardant polymer" or "flame retardant material" shall have the generally accepted meaning in the art. The flame retardancy or the flammability properties of the materials as described herein can be measured by any of the generally known methods such as for example UL 94 flame rating methods.

By the term, "a monomer repeat unit is derived" is meant that the polymeric repeating units are polymerized (formed) from, e.g., polycyclic norbornene-type monomers, wherein the resulting polymers are formed by 2,3 enchainment of norbornene-type monomers as shown below:

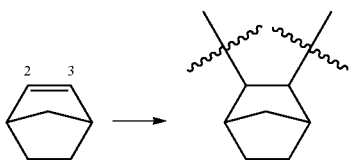

Surprisingly, it has now been found that certain of the vinyl addition polymers as described herein can be made from a variety of polycycloolefin monomers under mass polymerization conditions.

Accordingly, there is provided a vinyl addition polymer encompassing one or more first type of repeating units represented by formula (IA), said first type of repeating unit is derived from a monomer of formula (I):

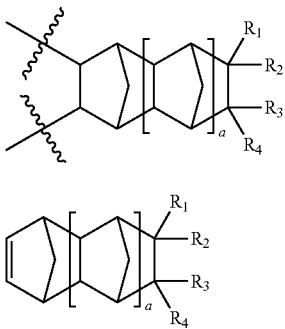

wherein:

∿ denotes a place of bonding with another repeat unit;

a is an integer 0, 1 or 2;

$R_1$, $R_2$, $R_3$ and $R_4$ are the same or different and each independently of one another is selected from hydrogen, linear or branched $(C_1\text{-}C_{16})$alkyl, hydroxy$(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl, perfluoro$(C_6\text{-}C_{10})$aryl$(C_1\text{-}C_3)$alkyl, di$(C_1\text{-}C_2)$alkylmaleimide$(C_3\text{-}C_6)$alkyl, di$(C_1\text{-}C_2)$alkylmaleimide$(C_2\text{-}C_6)$alkoxy$(C_1\text{-}C_2)$alkyl, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl, $(C_5\text{-}C_{10})$heteroaryloxy$(C_1\text{-}C_3)$alkyl, $(C_6\text{-}C_{10})$aryloxy, $(C_5\text{-}C_{10})$heteroaryloxy, $(C_1\text{-}C_6)$acyloxy, where each of the aforementioned substituents are optionally substituted with a group selected from halogen or hydroxy; and at least one second type of repeat unit derived from one of the monomers selected from the group consisting of:

a monomer of formula (II):

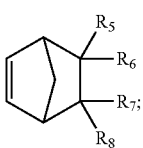

wherein:

at least one of $R_5$, $R_6$, $R_7$ and $R_8$ independently represents a group of formula (A):

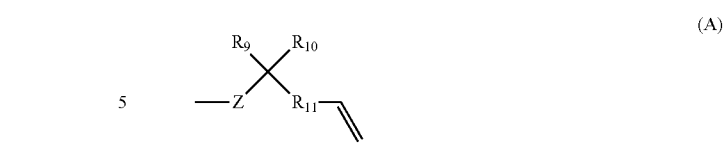

wherein:

Z is selected from —CO—O—, —O—CO— and —O—CO—O—;

$R_9$ and $R_{10}$ are the same or different and each independently of one another is selected from linear or branched $(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl and perfluoro$(C_6\text{-}C_{10})$aryl$(C_1\text{-}C_3)$alkyl; Rut is selected from substituted or unsubstituted $(C_1\text{-}C_6)$alkylene, $(C_6\text{-}C_{10})$arylene $(C_6\text{-}C_{10})$aryl$(C_2\text{-}C_6)$alkylene and $(C_2\text{-}C_6)$alkyl$(C_6\text{-}C_{10})$arylene;

remaining one or more of $R_5$, $R_6$, $R_7$ and $R_8$ independently represents hydrogen, linear or branched $(C_1\text{-}C_{12})$alkyl, hydroxy$(C_1\text{-}C_{12})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl, perfluoro$(C_6\text{-}C_{10})$aryl$(C_1\text{-}C_3)$alkyl, $(C_5\text{-}C_{10})$heteroaryl, $(C_5\text{-}C_{10})$heteroaryl$(C_1\text{-}C_3)$alkyl, hydroxy, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl, $(C_5\text{-}C_{10})$heteroaryloxy$(C_1\text{-}C_3)$alkyl, $(C_6\text{-}C_{10})$aryloxy, $(C_5\text{-}C_{10})$heteroaryloxy, $(C_1\text{-}C_6)$acyloxy and halogen;

a monomer of formula (III):

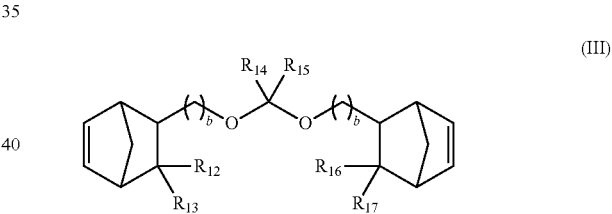

wherein:

b is an integer from 2 to 6;

$R_{12}$, $R_{13}$, $R_{16}$ and $R_{17}$ are the same or different and each independently of one another is selected from hydrogen, linear or branched $(C_1\text{-}C_{16})$alkyl, hydroxy$(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl, perfluoro$(C_6\text{-}C_{10})$aryl$(C_1\text{-}C_3)$alkyl, di$(C_1\text{-}C_2)$alkylmaleimide$(C_3\text{-}C_6)$alkyl, di$(C_1\text{-}C_2)$alkylmaleimide$(C_2\text{-}C_6)$alkoxy$(C_1\text{-}C_2)$alkyl, hydroxy, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl, $(C_5\text{-}C_{10})$heteroaryloxy$(C_1\text{-}C_3)$alkyl, $(C_6\text{-}C_{10})$aryloxy, $(C_5\text{-}C_{10})$heteroaryloxy, $(C_1\text{-}C_6)$acyloxy, where each of the aforementioned substituents are optionally substituted with a group selected from halogen or hydroxy; and $R_{14}$ and $R_{15}$ are the same or different and each independently of one another is selected from linear or branched $(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl and perfluoro$(C_6\text{-}C_{10})$aryl$(C_1\text{-}C_3)$alkyl; and a monomer of formula (IV):

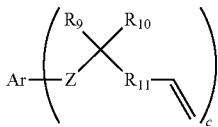

wherein:

c is an integer from 2 to 6;

Ar is $(C_6-C_{10})$aryl; and $Z$, $R_9$, $R_{10}$ and $R_{11}$ are as defined above.

In an embodiment of this invention the vinyl addition polymer of this invention encompasses one or more monomers of formula (I) which is having:

a is 0 or 1;

at least one of $R_1$, $R_2$, $R_3$ and $R_4$ is selected from hydrogen, linear or branched $(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl; and each of the remaining $R_1$, $R_2$, $R_3$ and $R_4$ is hydrogen.

Representative examples of monomers of formula (I) include the following without any limitations:

bicyclo[2.2.1]
hept-2-ene (NB)

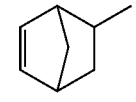

5-methylbicyclo[2.2.1]
hept-2-ene (MeNB)

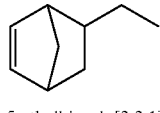

5-ethylbicyclo[2.2.1]
hept-2-ene (EtNB)

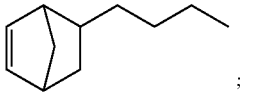

5-n-butylbicyclo[2.2.1]
hept-2-ene (BuNB)

5-hexylbicyclo[2.2.1]hept-2-ene (HexNB)

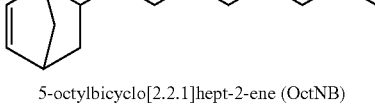

5-octylbicyclo[2.2.1]hept-2-ene (OctNB)

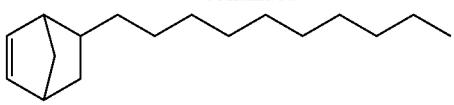

5-decylbicyclo[2.2.1]hept-2-ene (DecNB)

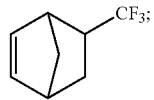

5-trifluoromethylbicyclo[2.2.1]
hept-2-ene (CF$_3$NB)

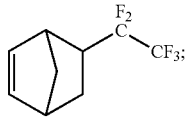

5-perfluoroethylbicyclo[2.2.1]
hept-2-ene (C$_2$F$_5$NB)

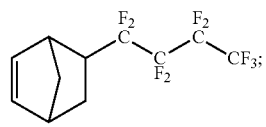

5-n-perfluorobutylbicyclo[2.2.1]
hept-2-ene (C$_4$F$_9$NB)

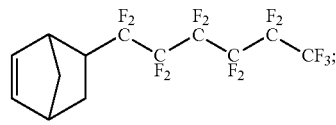

5-perfluorohexylbicyclo[2.2.1]
hept-2-ene (C$_6$F$_{13}$NB)

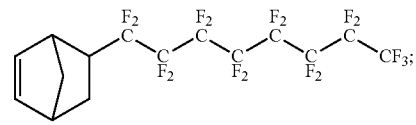

5-perfluorooctylbicyclo[2.2.1]hept-2-ene (OctNB)

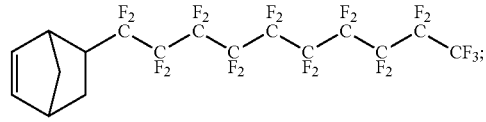

5-perfluorodecylbicyclo[2.2.1]hept-2-ene (DecNB)

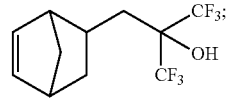

norbornenyl-2-trifluoromethyl-3,3,3-
trifluoropropan-2-ol (HFANB)

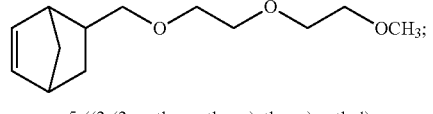

5-((2-(2-methoxyethoxy)ethoxy)methyl)
bicyclo[2.2.1]hept-2-ene (NBTON)

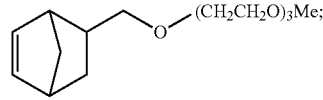

1-(bicyclo[2.2.1]hept-5-en-2-yl)-2,5,8,11-
tetraoxadodecane (NBTODD)

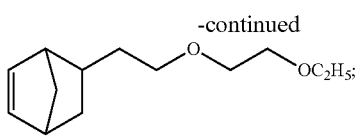

5-(2-(2-ethoxyethoxy)ethyl)
bicyclo[2.2.1]hept-2-ene

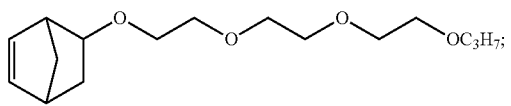

5-(2-(2-(2-propoxyethoxy)ethoxy)ethoxy)bicyclo[2.2.1]hept-2-ene

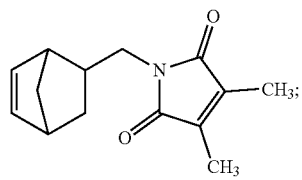

1-(bicyclo[2.2.1]hept-5-en-2-ylmethyl)-3,4-
dimethyl-1H-pyrrole-2,5-dione (MeDMMINB)

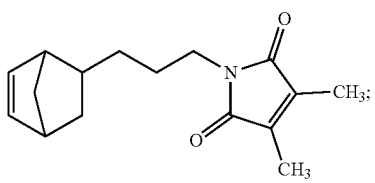

1-(3-(bicyclo[2.2.1]hept-5-en-2-yl)proplyl)-3,4-
dimethyl-1H-pyrrole-2,5-dione (PrDMMINB)

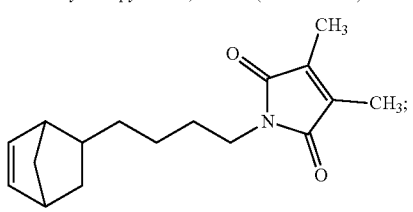

1-(4-(bicyclo[2.2.1]hept-5-en-2-yl)butyl)-3,4-
dimethyl-1H-pyrrole-2,5-dione (BuDMMINB)

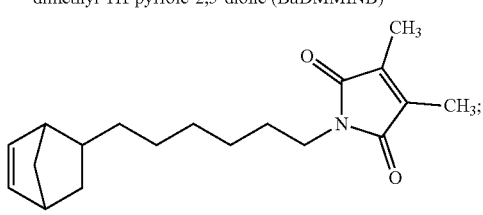

1-(6-(bicyclo[2.2.1]hept-5-en-2-yl)hexyl)-3,4-
dimethyl-1H-pyrrole-2,5-dione (HexDMMINB)

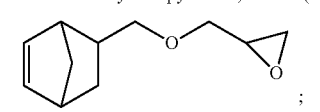

2-((bicyclo[2.2.1]hept-5-en-2-ylmethoxy)
methly)oxirane (MGENB)

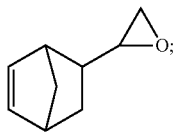

2-(bicyclo[2.2.1]
hept-5-en-2-yl)
oxirane

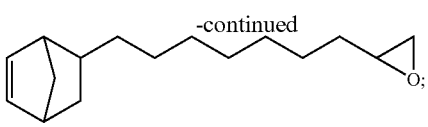

2-(7-(bicyclo[2.2.1]hept-5-en-2-yl)heptyl)oxirane

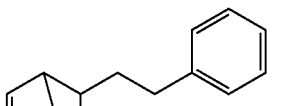

5-phenethylbicyclo[2.2.1]
hept-2-ene (PENB)

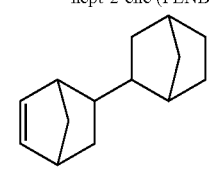

; and 2-(bicyclo[2.2.1]hept-5-en-2-yl)
bicyclo[2.2.1]heptane (also referred
to herein as NBANB)

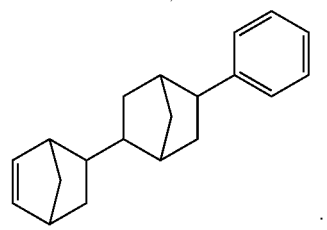

2-(bicyclo[2.2.1]hept-5-en-2-yl)-5-phenyl-bicyclo
[2.2.1]heptane (also referred to herein as NBNBAPh)

Accordingly, in one of the embodiments the vinyl addition polymer of this invention encompasses one or more monomer of formula (I) selected from the group consisting of:
bicyclo[2.2.1]hept-2-ene (NB);
norbornenyl-2-trifluoromethyl-3,3,3-trifluoropropan-2-ol (HFANB);
5-hexylbicyclo-[2.2.1]hept-2-ene (HexNB);
5-octylbicyclo[2.2.1]hept-2-ene (OctNB);
5-decylbicyclo[2.2.1]hept-2-ene (DecNB);
5-perfluorobutylbicyclo[2.2.1]hept-2-ene ($C_4F_9$NB);
5-phenethylbicyclo[2.2.1]hept-2-ene (PENB); and
2-(bicyclo[2.2.1]hept-5-en-2-yl)bicyclo[2.2.1]heptane (NBANB).

In a further embodiment of this invention the vinyl addition polymer of this invention encompasses at least two distinct types of monomers of formula (I).

In yet another embodiment the vinyl addition polymer of this invention encompasses at least one of the monomers of formula (I), which is 5-decylbicyclo[2.2.1]hept-2-ene (DecNB).

In yet another embodiment the vinyl addition polymer of this invention encompasses at least one of the monomers of formula (II), which is 5-phenethylbicyclo[2.2.1]hept-2-ene (PENB).

In yet another embodiment the vinyl addition polymer of this invention encompasses at least one of the monomers of formula (I), which is 5-hexylbicyclo-[2.2.1]hept-2-ene (HexNB).

It has now been found that use of a polymerizable monomer having certain functional group which undergoes cleavage under certain conditions such as for example under thermolytic conditions and or such suitable conditions results in increased flame retardant effect. That is, when a polymeric molecule cleaves into smaller fragments, the composition degrades without burning when subject to flammable conditions. Accordingly, surprisingly, it has now been found that polymerizing one or more monomers of formula (1) with at least one monomer which contains a thermally labile functional group results in a polymer having excellent flame retardant property. Suitable examples of such thermally labile groups include without any limitation, ether, diether, such as acetals or ketals, esters or diesters, carbonates or dicarbonates, and the like. Various other thermally labile moieties may also include phosphate, phosphonate, phosphite, silicate, sulfate, sulfide, sulfonate, and the like.

In another embodiment of this invention examples of such monomers containing a variety of such thermally labile functional groups are compounds of formulae (II), (III) and (IV) as described herein.

Accordingly, in one of the embodiments of this invention the vinyl addition polymer of this invention encompasses one or more repeat units derived from corresponding monomers of formula (I) and a second type of repeat unit derived from a monomer of formula (II).

One embodiment of this invention comprises a vinyl addition polymer, wherein the second type of repeat unit derived from a monomer of formula (II) is having:

Z is —CO—O—;

$R_9$ and $R_{10}$ are the same or different and each independently of one another is selected from linear or branched $(C_1-C_{10})$alkyl, perfluoro$(C_1-C_5)$alkyl, phenyl, naphthyl, benzyl, phenylethyl, perfluorophenyl and perfluorobenzyl;

$R_{11}$ is selected from substituted or unsubstituted $(C_2-C_4)$ alkylene and phenylene; remaining one or more of $R_5$, $R_6$, $R_7$ and $R_8$ independently represents hydrogen, linear or branched $(C_1-C_{12})$alkyl, perfluoro$(C_1-C_{12})$alkyl, $(C_6-C_{10})$ aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl.

Any monomer of formula (II) can be employed in this invention to form the vinyl addition polymer of this invention. Non-limiting examples of a monomer of formula (II) are selected from the group consisting of:

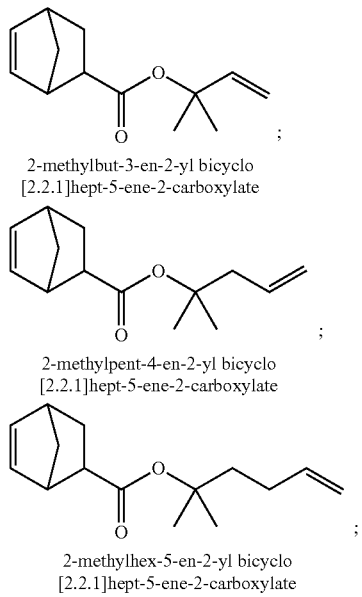

2-methylbut-3-en-2-yl bicyclo[2.2.1]hept-5-ene-2-carboxylate 2-methylpent-4-en-2-yl bicyclo[2.2.1]hept-5-ene-2-carboxylate 2-methylhex-5-en-2-yl bicyclo[2.2.1]hept-5-ene-2-carboxylate -continued

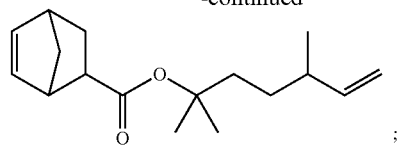

2,5-dimethylhept-6-en-2-yl bicyclo[2.2.1]hept-5-ene-2-carboxylate

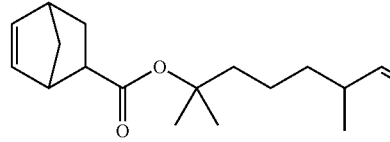

2,6-dimethyloct-7-en-2-yl bicyclo[2.2.1]hept-5-ene-2-carboxylate

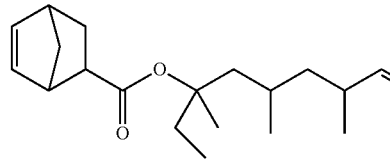

3,5,7-trimethylnon-8-en-3-yl bicyclo[2.2.1]hept-5-ene-2-carboxylate

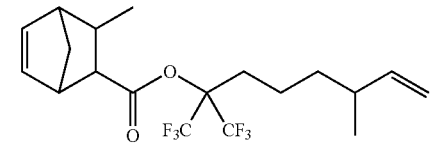

1,1,1-trifluoro-6-methly-2-(trifluoromethyl)oct-7-en-2-yl 3-methylbicyclo[2.2.1]hept-5-ene-2-carboxylate

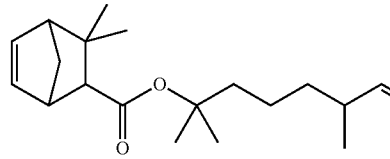

2,6-dimethyloct-7-en-2-yl 3,3-dimethylbicyclo[2.2.1]hept-5-ene-2-carboxylate (NBDMOC)

In yet another embodiment of this invention the vinyl addition polymer of this invention comprises one or more repeat units derived from corresponding monomers of formula (I) and a second type of repeat unit derived from a monomer of formula (III).

In this aspect of the embodiment of this invention the vinyl addition polymer of this invention encompasses a second type of repeat unit derived from a monomer of formula (III) which is having:

b is an integer from 2 to 4;

$R_{12}$, $R_{13}$, $R_{16}$ and $R_{17}$ are the same or different and each independently of one another is selected from hydrogen, linear or branched $(C_1-C_{12})$alkyl, perfluoro$(C_1-C_8)$alkyl, $(C_3-C_7)$cycloalkyl, $(C_6-C_9)$bicycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, di$(C_1-C_2)$alkylmaleimide$(C_3-C_6)$ alkyl, where each of the aforementioned substituents are optionally substituted with a group selected from halogen or hydroxy; and $R_{14}$ and $R_{15}$ are the same or different and each independently of one another is selected from linear or branched $(C_1-C_{12})$alkyl, perfluoro$(C_1-C_8)$alkyl, $(C_3-C_7)$cycloalkyl, $(C_6-C_{10})$aryl, $(C_6-C_{10})$aryl$(C_1-C_3)$alkyl, perfluoro$(C_6-C_{10})$ aryl and perfluoro$(C_6-C_{10})$aryl$(C_1-C_3)$alkyl.

Any of the monomers of formula (III) as described herein can be employed to make the vinyl addition polymer of this aspect of the invention. Non-limiting examples of monomers of formula (III), so as to form such second type of repeat units, are respectively selected from the group consisting of:

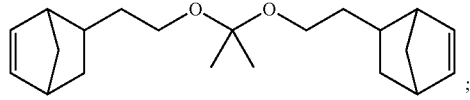

5,5'-((propane-2,2-diylbis(oxy))bis(ethane-2,1-diyl))
bis(bicyclo[2.2.1]hept-2-ene)(NBEtO)₂CMe₂

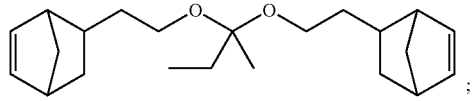

5,5'-((butane-2,2-diylbis(oxy))bis(ethane-2,1-diyl))
bis(bicyclo[2.2.1]hept-2-ene)

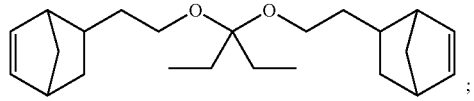

5,5'-((pentane-3,3-diylbis(oxy))bis(ethane-2,1-diyl))
bis(bicyclo[2.2.1]hept-2-ene)

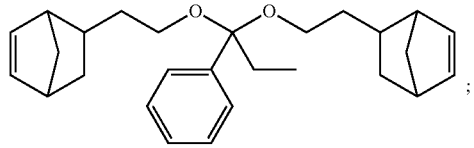

5,5'-(((1-phenylpropane-1,1-diyl)bis(oxy))bis
(ethane-2,1-diyl))bis(bicyclo[2.2.1]hept-2-ene)

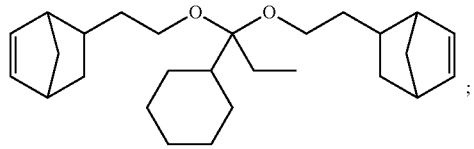

5,5'-(((1-cyclohexylpropane-1,1-diyl)bis(oxy))bis
(ethane-2,1-diyl))bis(bicyclo[2.2.1]hept-2-ene)

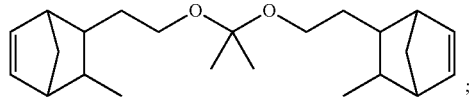

6,6'-((propane-2,2-diylbis(oxy))bis(ethane-2,1-diyl))
bis(5-methylbicyclo[2.2.1]hept-2-ene)

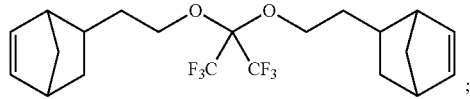

5,5'-(((perfluoropropane-2,2-diyl)bis(oxy))bis
(ethane-2,1-diyl))bis(bicyclo[2.2.1]hept-2-ene)

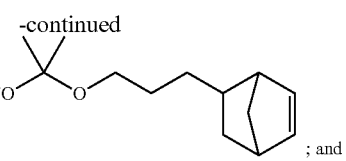

; and 5,5'-((propane-2,2-diylbis(oxy))bis(propane-
3,1-diyl))bis(bicyclo[2.2.1]hept-2-ene)

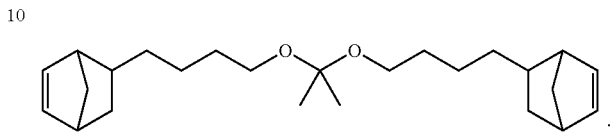

5,5'-((propane-2,2-diylbis(oxy))bis(butane-
4,1-diyl))bis(bicyclo[2.2.1]hept-2-ene)

FIG. 1 illustrates a vinyl addition polymer of this invention where DecNB and (NBEtO)₂CMe₂ monomers are polymerized in the presence of organopalladium compound as the initiator to initiate the vinyl addition polymerization. In addition, bicyclo[4,2,0]octene (BCO) is used as a CTA, which aspect is described in detail further below.

In another embodiment of this invention the vinyl addition polymer of this invention comprises one or more repeat units derived from corresponding monomers of formula (I) and a second type of repeat unit derived from a monomer of formula (IV).

In this aspect of the invention the vinyl addition polymer encompasses a second type of repeat unit derived from a monomer of formula (III) which is having:

c is an integer from 2 to 4;

Ar is phenyl or naphthyl; and

Z is —COO;

$R_9$ and $R_{10}$ are the same or different and each independently of one another is selected from linear or branched ($C_1$-$C_{10}$)alkyl, perfluoro($C_1$-$C_8$)alkyl, phenyl, naphthyl, benzyl, phenylethyl, perfluorophenyl and perfluorobenzyl;

$R_{11}$ is selected from substituted or unsubstituted ($C_2$-$C_4$) alkylene and phenylene; remaining one or more of $R_5$, $R_6$, $R_7$ and $R_8$ independently represents hydrogen, linear or branched ($C_1$-$C_{12}$)alkyl, perfluoro($C_1$-$C_{12}$)alkyl, ($C_6$-$C_{10}$) aryl, ($C_6$-$C_{10}$)aryl($C_1$-$C_3$)alkyl, perfluoro($C_6$-$C_{10}$)aryl and perfluoro($C_6$-$C_{10}$)aryl($C_1$-$C_3$)alkyl.

Any of the monomers of formula (IV) can be employed to form the vinyl addition polymer of this invention. Non-limiting examples of such second type of repeat unit is derived from a monomer of formula (IV) which is selected from the group consisting of:

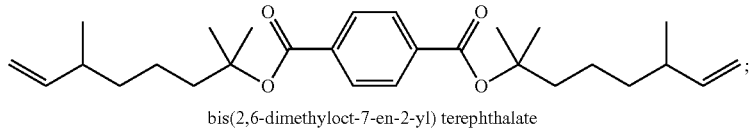

bis(2,6-dimethyloct-7-en-2-yl) terephthalate

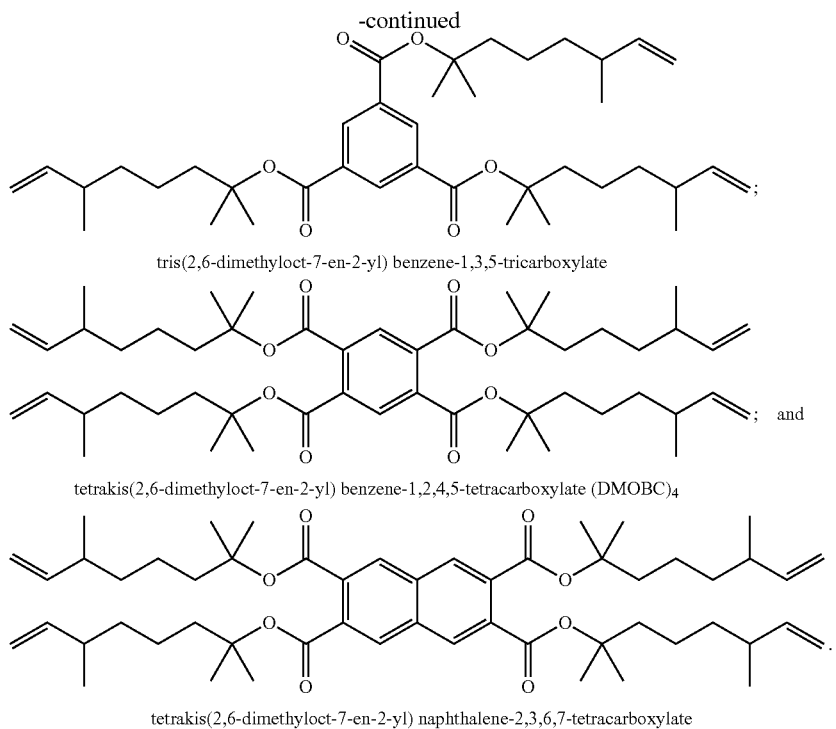

tris(2,6-dimethyloct-7-en-2-yl) benzene-1,3,5-tricarboxylate tetrakis(2,6-dimethyloct-7-en-2-yl) benzene-1,2,4,5-tetracarboxylate (DMOBC)$_4$ tetrakis(2,6-dimethyloct-7-en-2-yl) naphthalene-2,3,6,7-tetracarboxylate The monomers of formulae (II), (III) and (IV) can be synthesized by any of the methods known in the art or they are available commercially. Specifically, some of the compounds of formulae (II), (III) and (IV) are known in the literature and others can be prepared by methods used to prepare similar compounds as reported in the literature and as further described herein. A few of the monomers of formulae (II), (III) and (IV) are specifically described herein in the Examples that follow. Various other monomers within the scope of formulae (II), (III) and (IV) can be made similarly.

In another embodiment of this invention the vinyl addition polymers of this invention can be readily made by employing a variety of organo-transition metal compounds which facilitate the polymerization of the polycyclic olefin in the presence of a chain transfer agent under mass polymerization conditions. Generally, such organometallic compounds are capable of reacting with the chain transfer agent to form an intermediate "transition metal-hydride," which reacts further with the olefinic monomer thus initiating the polymerization. Various organo-transition metal compounds that brings about such a reaction can be used in this invention. In some embodiments of this invention such organo-transition metal compounds include compounds formed from nickel, palladium or platinum, among others. Other suitable transition metals include any of the Group X transition metal or Group IX metal, such as for example, cobalt, rhodium or iridium.

In another embodiment of this invention the organo-transition metal compound includes a Lewis Base, which is coordinately bonded to the metal atom, M. That is, the Lewis Base is bonded to the metal atom by sharing both of its lone pair of electrons. Any of the Lewis Base known in the art can be used for this purpose. Advantageously, it has now been found that a Lewis Base, which can dissociate readily under the polymerization conditions as described further in detail below generally provides more suitable compounds of formula (I) as polymerization catalysts. Thus, in one aspect of this invention judicious selection of the Lewis Base will provide a modulation of the catalytic activity of the compounds of this invention.

Accordingly, it has now been found that suitable LBs that can be employed include without any limitation substituted and unsubstituted nitriles, including alkyl nitrile, aryl nitrile or aralkyl nitrile; phosphine oxides, including substituted and unsubstituted trialkyl phosphine oxides, triaryl phosphine oxides, triaralkyl phosphine oxides, and various combinations of alkyl, aryl and aralkyl phosphine oxides; substituted and unsubstituted pyrazines; substituted and unsubstituted pyridines; phosphites, including substituted and unsubstituted trialkyl phosphites, triaryl phosphites, triaralkyl phosphites, and various combinations of alkyl, aryl and aralkyl phosphites; phosphines, including substituted and unsubstituted trialkyl phosphines, triaryl phosphines, triaralkyl phosphines, and various combinations of alkyl, aryl and aralkyl phosphines. Various other LBs that may be employed include various ethers, alcohols, ketones, amines and anilines, arsines, stibines, and the like.

In an embodiment of this invention, the LB is selected from acetonitrile, propionitrile, n-butyronitrile, tert-butyronitrile, benzonitrile ($C_6H_5CN$), 2,4,6-trimethylbezonitrile, phenyl acetonitrile ($C_6H_5CH_2CN$), pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,6-di-t-butylpyridine, 2,4-di-t-butylpyridine, 2-methoxypyridine, 3-methoxypyridine, 4-methoxypyridine, pyrazine, 2,3,5,6-tetramethylpyrazine, diethyl ether, di-n-butyl ether, dibenzyl ether, tetrahydrofuran, tetrahydropyran, benzophenone, triphenylphosphine oxide, triphenyl phosphate and $PR_3$, where R is independently selected from methyl, ethyl, ($C_3$-$C_6$)alkyl, substituted or unsubstituted ($C_3$-$C_7$)cycloalkyl, ($C_6$-$C_{10}$)aryl, ($C_6$-$C_{10}$) aralkyl, methoxy, ethoxy, ($C_3$-$C_6$)alkoxy, substituted or unsubstituted $(C_3-C_1)$cycloalkoxy, $(C_6-C_{10})$aryloxy and $(C_6-C_{10})$aralkyloxy. Representative examples of $PR_3$ include without any limitation trimethyl phosphine, triethyl phosphine, tri-n-propyl phosphine, tri-iso-propyl phosphine, tri-n-butyl phosphine, tri-iso-butyl phosphine, tri-tert-butyl phosphine, tricyclopentylphosphine, triallylphosphine, tricyclohexylphosphine, triphenyl phosphine, trimethyl phosphite, triethyl phosphite, tri-n-propyl phosphite, tri-iso-propyl phosphite, tri-n-butyl phosphite, tri-iso-butyl phosphite, tri-tert-butyl phosphite, tricyclopentylphosphite, triallylphosphite, tricyclohexylphosphite, triphenyl phosphite, and the like. It should however be noted that various other known LBs which will bring about the intended activity can also be used in this embodiment of the invention.

Other examples of organophosphorus compounds suitable as LBs include phosphinite and phosphonate ligands. Representative examples of phosphinite ligands include but are not limited to methyl diphenylphosphinite, ethyl diphenylphosphinite, isopropyl diphenylphosphinite, and phenyl diphenylphosphinite. Representative examples of phosphonite ligands include but are not limited to diphenyl phenylphosphonite, dimethyl phenylphosphonite, diethyl methylphosphonite, diisopropyl phenylphosphonite, and diethyl phenylphosphonite.

In a further aspect of this invention, it has now been found that the organo-transition metal compound having a counter anion, $Z^\ominus$, which is a weakly coordinating anion (WCA) provides better catalytic activity. That is, the WCA is an anion which is only weakly coordinated to the cation complex. It is sufficiently labile to be displaced by a neutral Lewis base, solvent or monomer. More specifically, the WCA anion functions as a stabilizing anion to the cation complex and does not form a covalent bond with the metal atom, M. The WCA anion is relatively inert in that it is non-oxidative, non-reducing, and non-nucleophilic.

In general, the WCA can be selected from borates, phosphates, arsenates, antimonates, aluminates, boratobenzene anions, carborane, halocarborane anions, sulfonamidate and sulfonates.

Broadly speaking, suitable borate anion can be represented by Formula A, phosphate, arsenate and antimonate anions can be represented by Formula B, and aluminate anions can be represented by Formula C:

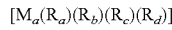
A

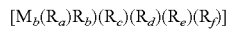
B

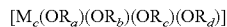
C

Wherein in Formula A, $M_a$ is boron, in Formula B $M_b$ is phosphorus, arsenic or antimony, in Formula C, $M_c$ is aluminum. $R_a$, $R_b$, $R_c$, $R_d$, $R_e$ and $R_f$ independently represent fluorine, linear and branched $C_1-C_{10}$ alkyl, linear and branched $C_1-C_{10}$ alkoxy, linear and branched $C_3-C_5$ haloalkenyl, linear and branched $C_3-C_{12}$ trialkylsiloxy, $C_{18}-C_{36}$ triarylsiloxy, substituted and unsubstituted $C_6-C_{30}$ aryl, and substituted and unsubstituted $C_6-C_{30}$ aryloxy groups wherein $R_a$ to $R_f$ cannot all simultaneously represent alkoxy or aryloxy groups. When substituted the aryl groups can be monosubstituted or multisubstituted, wherein the substituents are independently selected from linear and branched $C_1-C_5$ alkyl, linear and branched $C_1-C_5$ haloalkyl, linear and branched $C_1-C_5$ alkoxy, linear and branched $C_1-C_5$ haloalkoxy, linear and branched $C_1-C_{12}$ trialkylsilyl, $C_6-C_{18}$ triarylsilyl, and halogen selected from chlorine, bromine, and fluorine.

Representative borate anions of Formula A include but are not limited to tetrafluoroborate, tetraphenylborate, tetrakis (pentafluorophenyl)borate, tetrakis(3,5-bis(trifluoromethyl) phenyl)borate, tetrakis(2-fluorophenyl)borate, tetrakis(3-fluorophenyl)borate, tetrakis(4-fluorophenyl)borate, tetrakis (3,5-difluorophenyl)borate, tetrakis(2,3,4,5-tetrafluorophenyl)borate, tetrakis(3,4,5,6-tetrafluorophenyl) borate, tetrakis(3,4,5-trifluorophenyl)borate, methyltris (perfluorophenyl)borate, ethyltris(perfluorophenyl)borate, phenyltris(perfluorophenyl)borate, tetrakis(1,2,2-trifluoroethylenyl)borate, tetrakis(4-tri-i-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl] borate, tetrakis[3-[1-methoxy-2,2,2-trifluoro-1-(trifluoromethyl)ethyl]-5-(trifluoromethyl)phenyl]borate, and tetrakis [3-[2,2,2-trifluoro-1-(2,2,2-trifluoroethoxy)-1-(trifluoromethyl)ethyl]-5-(trifluoromethyl)phenyl]borate.

Representative phosphates, arsenates, antimonates of Formula B include but are not limited to hexafluorophosphate, hexaphenylphosphate, hexakis(pentafluorophenyl)phosphate, hexakis(3,5-bis(trifluoromethyl)phenyl)phosphate, hexafluoroarsenate, hexaphenylarsenate, hexakis(pentafluorophenyl)arsenate, hexakis(3,5-bis(trifluoromethyl)phenyl) arsenate, hexafluoroantimonate, hexaphenylantimonate, hexakis(pentafluorophenyl)antimonate, hexakis(3,5-bis(trifluoromethyl)phenyl)antimonate, and the like.

Representative aluminate anions of Formula C include but are not limited to tetrakis(pentafluorophenyl)aluminate, tris (nonafluorobiphenyl)fluoroaluminate, (octyloxy)tris(pentafluorophenyl)aluminate, tetrakis(3,5-bis(trifluoromethyl) phenyl)aluminate, and methyltris(pentafluorophenyl) aluminate.

In an embodiment of this invention suitable $Z^\ominus$ is selected from $B(C_6F_5)_4^\ominus$, $B[C_6H_3(CF_3)_2]_4^\ominus$, $B(C_6H_5)_4^\ominus$, $[Al(OC(CF_3)_2C_6F_5)_4]^\ominus$, $BF_4^\ominus$, $PF_6^\ominus$, $AsF_6^\ominus$, $SbF_6^\ominus$, $(CF_3SO_2)N^\ominus$ and $CF_3SO_3^\ominus$.

In one of the embodiments of this invention, the reaction composition of this invention encompasses an organo-transition metal compound of the formula (V):

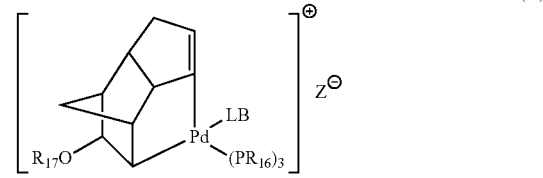
(V)

wherein,

LB is selected from pyridine, acetonitrile or $C_6H_5CN$;

$Z^\ominus$ is selected from $B(C_6F_5)_4^\ominus$, $B(C_6H_5)_4^\ominus$, $BF_4^\ominus$ or $CF_3SO_3^\ominus$;

$R_{16}$ is independently selected from methyl, ethyl, $(C_3-C_6)$ alkyl, substituted or unsubstituted $(C_3-C_7)$cycloalkyl, $(C_6-C_{10})$aryl, $(C_6-C_{10})$aralkyl, methoxy, ethoxy, $(C_3-C_6)$alkoxy, substituted or unsubstituted $(C_3-C_7)$cycloalkoxy, $(C_6-C_{10})$ aryloxy and $(C_6-C_{10})$aralkyloxy; and $R_{17}$ is methyl, ethyl, linear or branched $(C_3-C_6)$alkyl, $(C_6-C_{10})$aralkyl or RICO, where $R_7$ is methyl, ethyl or $(C_3-C_6)$alkyl.

In a further embodiment of this invention the compound of formula (V) is having the following substituents:

LB is acetonitrile;
$Z^\ominus$ is $B(C_6F_5)_4^\ominus$;
$R_{16}$ is n-propyl, isopropyl, tert-butyl or phenyl; and
$R_{17}$ is n-propyl, isopropyl, tert-butyl or —OCOCH$_3$.

In another embodiment the reaction composition of this invention encompasses an organo-transition metal compound represented by formula (VA):

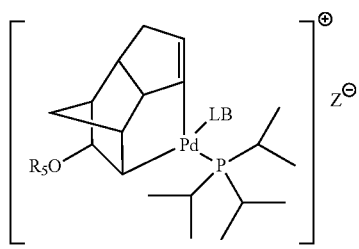

(VA)

wherein:
LB is acetonitrile or pyridine;
$Z^\ominus$ is selected from $B(C_6F_5)_4^\ominus$ or $BF_4^\ominus$; and
$R_{17}$ is isopropyl or —OCOCH$_3$.

In this aspect of the embodiment, the compound of formula (VA) is having the substituents as follows:
LB is either acetonitrile or pyridine; $Z^\ominus$ is $B(C_6F_5)_4^\ominus$ or $BF_4^\ominus$.

In yet another embodiment the reaction composition of this invention encompasses an organo-transition metal compound represented by formula (VB):

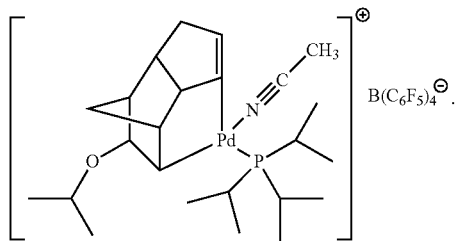

(VB)

In yet another embodiment the reaction composition of this invention encompasses an organo-transition metal compound represented by formula (VC):

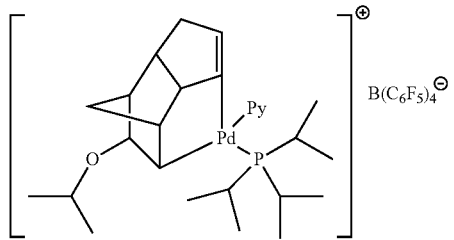

(VC)

wherein Py is pyridine.

In yet another embodiment the reaction composition of this invention encompasses an organo-transition metal compound represented by formula (IIID):

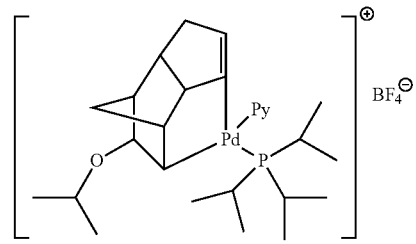

(IIID)

wherein Py is pyridine.

In another embodiment the reaction composition of this invention encompasses an organo-transition metal compound represented by formula (VI):

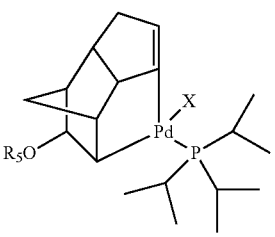

(VI)

wherein:
X is chlorine or triflate; and
$R_5$ is n-propyl, isopropyl or —OCOCH$_3$.

In further embodiments of this invention the compound of formula (VI) encompasses where $R_5$ is isopropyl or n-propyl; or where $R_5$ is —OCOCH$_3$.

Non-limiting exemplary compounds of formula (VI), can be represented by formulae (VIA), (VIB) or (VIC):

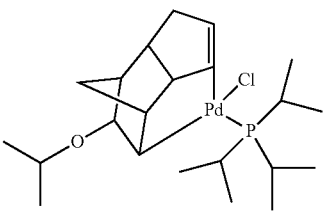

(VIA)

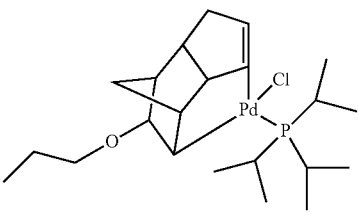

(VIB)

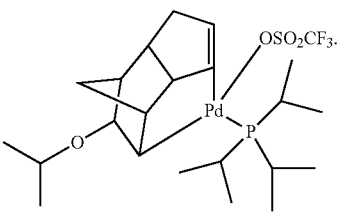

(VIC)

In another embodiment of this invention, non-limiting examples of one or more organo-transition metal compounds that can be employed in the reaction composition can be selected from the group consisting of:
trans-[Pd(NCMe)(OAc)(P(i-propyl)$_3$)$_2$]B(C$_6$F$_5$)$_4$,
trans-[Pd(NCC(CH$_3$)$_3$)(OAc)(P(i-propyl)$_3$)$_2$]B(C$_6$F$_5$)$_4$,
trans-[Pd(OC(C$_6$H$_5$)$_2$)(OAc)(P(i-propyl)$_3$)$_2$]B(C$_6$F$_5$)$_4$,
trans-[Pd(HOCH(CH$_3$)$_2$)(OAc)(P(i-propyl)$_3$)$_2$]B(C$_6$F$_5$)$_4$,
trans-[Pd(NCMe)(OAc)(P(cyclohexyl)$_3$)$_2$]B(C$_6$F$_5$)$_4$,
Pd(OAc)$_2$(P(cyclohexyl)$_3$)$_2$,
Pd(OAc)$_2$(P(i-propyl)$_3$)$_2$,
Pd(OAc)$_2$(P(i-propyl)$_2$(phenyl))$_2$,
trans-[Pd(NCMe)(OAc)(P(cyclohexyl)$_2$(t-butyl))$_2$]B(C$_6$F$_5$)$_4$, where OAc is OCOCH$_3$.

In yet another embodiment of this invention, further non-limiting examples of one or more organo-transition metal compounds that can be employed in the reaction composition can be selected from the group consisting of:
nickel(2,4,6-trifluoromethylphenyl)$_2$;
nickel($\eta^6$-toluene)(pentafluorophenyl)$_2$;
nickel (tetrahydrofuran)$_2$(pentafluorophenyl)$_2$;
[(allyl)Ni(1,4-cyclooctadiene)]PF$_6$,
[(crotyl)Ni(1,4-cyclooctadiene)]PF$_6$; and
[(allyl)Ni(1,4-cyclooctadiene)]SbF$_6$.

In another aspect of this invention, the vinyl addition polymers of this invention are made using an organo-transition metal compound, such as for example, a compound of formula (V) or a compound of formula (VI) which can be further admixed in-situ with certain of the compounds of formula (VII), as discussed below, to form very active bicomponent initiator systems. It has now surprisingly been found that such catalyst systems are very useful for preparing a variety of polymers from certain of the cyclo olefinic monomers as described herein under mass polymerization conditions and avoid extraneous ligands, such as acetonitrile.

Accordingly, the reaction composition of this invention further encompasses a compound of the formula (VII):

wherein
$M_d^{\oplus}$ is a cation selected from lithium, sodium, potassium, cesium, barium, ammonium and linear or branched tetra($C_1$-$C_4$)alkyl ammonium;
$Z^{\ominus}$ is a weakly coordinating anion selected from selected from B(C$_6$F$_5$)$_4^{\ominus}$, B[C$_6$H$_3$(CF$_3$)$_2$]$_4^{\ominus}$, B(C$_6$H$_5$)$_4^{\ominus}$, [Al(OC(CF$_3$)$_2$C$_6$F$_5$)$_4$]$^{\ominus}$, BF$_4^{\ominus}$, PF$_6^{\ominus}$, AsF$_6^{\ominus}$, SbF$_6^{\ominus}$, (CF$_3$SO$_2$)N$^{\ominus}$ and CF$_3$SO$_3^{\ominus}$ Further, the compound of formula (VII) is selected from the group consisting of:
lithium tetrafluoroborate;
lithium triflate;
lithium tetrakis(pentafluorophenyl)borate;
lithium (diethyl ether) tetrakis(pentafluorophenyl)borate ([Li(OEt$_2$)$_{2.5}$][B(C$_6$F$_5$)$_4$]) (LiFABA);
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyarsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate; and
lithium methyltris(pentafluorophenyl)aluminate.

As noted, the polymerization reactions can be carried out neat, i.e., under mass polymerization conditions. That is, by practice of the instant invention it is now possible to make a variety of polymers containing one or more functionalized norbornene monomer of formula (I) and at least one compound of formulae (II), (III) or (IV) in the presence of a chain transfer agent, i.e. a compound of formula (VIII) as further discussed below. The polymerizations are generally carried out in the presence of an organo-transition metal compound, such as for example, an unicomponent initiator (i.e., a compound of formula (V)) or a bicomponent initiator (i.e., a compound of formula (VI) as initiator) in combination with a compound of formula (VII) as activator) as described herein. However, it should be noted that even when an unicomponent initiator, such as, compound of formula (V) or other similar palladium compound as described herein is employed, it has now been found that it may be advantageous to use a compound of formula (VII) as an activator compound in combination with any of the unicomponent initiator compound as described herein.

It has also been found that the organo-transition metal compounds as described herein either as unicomponent or bicomponent compositions as described herein are highly active. Thus it is now possible to make polymers of high quality by employing small amounts of these compounds as polymerization initiators. Accordingly, in one of the embodiments the addition polymerization can effectively be carried out using monomer to unicomponent initiator molar ratio of at least 100:1 based on the total moles of monomers and the initiator employed. That is, 100 moles of monomer to one mole of the unicomponent initiator is employed. In other embodiments the molar ratio of monomer:initiator can be 1,000,000:1; 500,000:1; 100,000:1; 20,000:1; 10,000:1, 5,000:1, 500:1, 400:1, 200:1, and the like. When bicomponent initiator systems are employed the molar ratio of monomer:initiator:activator can be at least 100:1:1. In other embodiments the molar ratio of monomer:initiator:activator can be 1,000,000:1:1; 500,000:1:1; 100,000:1:1; 20,000:1:1; 10,000:1:1, 1,000:1:1, 500:1:1, 400:1:1, 200:1:1, and the like. In some embodiments the activator is used in excess of the mole quantities of the initiator used, such as for example, molar ratios of initiator:activator can be from 1:1 to 1:6.

As noted, the monomers of formulae (I) to ((V) are polymerized under mass vinyl addition polymerization conditions in the presence of a suitable chain transfer agent (CTA).

Advantageously, a compound of formula (IX) acts effectively as a CTA.

wherein d is an integer from 0 to 4;

e is an integer from 0 to 2d+4;

each R is hydrogen, halogen, methyl, ethyl, linear or branched ($C_3$-$C_6$)alkyl, substituted or unsubstituted ($C_3$-$C_7$) cycloalkyl, ($C_6$-$C_{10}$)aryl, ($C_6$-$C_{10}$)aralkyl, methoxy, ethoxy, linear or branched ($C_3$-$C_6$)alkoxy, substituted or unsubstituted ($C_3$-$C_7$)cycloalkoxy, ($C_6$-$C_{10}$)aryloxy and ($C_6$-$C_{10}$) aralkyloxy.

The compounds of formula (IX) generally function as an effective chain transfer agent during mass polymerization of one or more monomers as described herein. Accordingly, any of the compounds of formula (IX) can be used in this invention which brings about the effects of chain transfer property. Surprisingly, it has now been found that any of the bicycloalkenes which have a ring strain such that it acts effectively as a chain transfer agent can be used. However, it should be noted that various other known mono- or polycycloolefinic compounds having a ring strain energy greater than 17 kcal/mole are also suitable as chain transfer agents for mass polymerization of certain polycyclic olefin monomers of formula (I) along with at least one monomer of formulae (II), (III) or (IV), as described herein. Examples of such olefins include trans-cyclooctene, norbornene, cyclobutene and the like. More specifically, compounds of formula (IX) are found to be effective as chain transfer agents for the polymerization of certain polycyclic olefin monomers of formula (I) along with at least one monomer of formulae (II), (III) or (IV).

The compounds of formula (IX) can be synthesized by any of the procedures known to one skilled in the art. Specifically, some of the compounds of formula (IX) are known in the literature and others can be prepared by methods used to prepare similar compounds as reported in the literature and as further described herein.

More specifically, the compounds of formula (IX) as disclosed herein can be synthesized according to the following procedures of Scheme 1, wherein d, e and R are as defined for Formula IX unless otherwise indicated.

Scheme 1

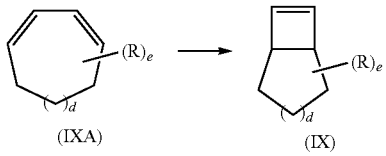

In general, in Scheme I, the compound of formula (IXA) is subjected to suitable reaction conditions to form a compound of formula (IX) in the presence of a suitable solvent. Such reaction conditions that may be suitable for such conversions include photolytic or thermolytic reaction conditions. It has been reported in the literature that compounds of formula (IXA) can conveniently be converted to compounds of formula (IX) by subjecting it to suitable photolysis in the presence of a hydrocarbon solvent such as heptane. See, for example, Liu, Robert S. H., Journal of American Chemical Society (1967), 89(1), 112-114. However, any other reaction condition that is known to one skill in the art to make the compounds of formula (IX) can also be employed.

One or more non-limiting examples of compound of formula (IX), where d=0, is selected from the group consisting of:

bicyclo[2.2.0]hex-2-ene;
5-methylbicyclo[2.2.0]hex-2-ene; and
5,6-dimethylbicyclo[2.2.0]hex-2-ene.

One or more non-limiting examples of compound of formula (I), where d=1 to 4, is selected from the group consisting of:

bicyclo[3.2.0]hept-6-ene;
2-methylbicyclo[3.2.0]hept-6-ene;
2,4-dimethylbicyclo[3.2.0]hept-6-ene;
2,4,6-trimethylbicyclo[3.2.0]hept-6-ene;
bicyclo[4.2.0]oct-7-ene;
2-methylbicyclo[4.2.0]oct-7-ene;
3-methylbicyclo[4.2.0]oct-7-ene;
2,3-dimethylbicyclo[4.2.0]oct-7-ene;
2,3,5-trimethylbicyclo[4.2.0]oct-7-ene;
2,3,4,5-tetramethylbicyclo[4.2.0]oct-7-ene;
bicyclo[5.2.0]non-8-ene;
2-methylbicyclo[5.2.0]non-8-ene;
2,5-dimethylbicyclo[5.2.0]non-8-ene;
bicyclo[6.2.0]dec-9-ene; and
2-methylbicyclo[6.2.0]dec-9-ene.

In another embodiment the polymer of this invention are made using a chain transfer agent, which is a compound of formula (IX) selected from the group consisting of bicyclo [3.2.0]hept-6-ene;
bicyclo[4.2.0]oct-7-ene;
bicyclo[5.2.0]non-8-ene; and
bicyclo[6.2.0]dec-9-ene.

In yet another embodiment the polymers of this invention are made in the presence of a compound of formula (I) selected from the group consisting of:
bicyclo[4.2.0]oct-7-ene;
2-methylbicyclo[4.2.0]oct-7-ene;
3-methylbicyclo[4.2.0]oct-7-ene;
2,3-dimethylbicyclo[4.2.0]oct-7-ene;
2,3,5-trimethylbicyclo[4.2.0]oct-7-ene; and
2,3,4,5-tetramethylbicyclo[4.2.0]oct-7-ene.

Advantageously, it has now been found that the monomers of formulae (II) or (IV) themselves can act both as a CTA and also serve as a monomer. That is, the vinyl end group in these monomers of formulae (II) or (IV) serves both as a CTA as well as a cross-linking site. Accordingly, when monomers of formulae (II) or (IV) are employed to make the vinyl addition polymers it is generally not necessary to use additional CTA. However, it should be noted that in some embodiments vinyl addition polymers encompassing the monomers of formulae (II) or (IV) may still employ additional CTAs as described herein in order to obtain processable polymers to make flame retardant materials as further described herein.

In a further aspect of this invention any amount of CTA can be employed to form the vinyl addition polymers of this invention which brings about the intended effect. That is, any amount of CTA can be employed such that one or more monomers of formula (I) can be polymerized with at least one monomer of formulae (II), (III) or (IV) under mass polymerization conditions employing a suitable transition metal compound. Accordingly, in one of the embodiments, the reaction composition to form the vinyl addition polymer of this invention encompasses a CTA in an amount of at least one (1) mole percent of the total loading of the monomers of formula (I) with at least one monomer of formulae (II), (III) or (IV). That is, CTA is present at least at a one (1) mole percent level compared to the total amount of one or more monomers of formula (I) in combination with at least one monomer of formulae (II), (III) or (IV). In yet another embodiment the reaction composition to form the vinyl addition polymer of this invention encompasses CTA in an amount of from one (1) to ten (10) mole percent of the total loading of the monomers of formula (I) in combination with at least one monomer of formulae (II), (III) or (IV). In yet another embodiment the reaction composition to form the vinyl addition polymer of this invention encompasses CTA in an amount of from five (5) to fifty (50) mole percent of the total loading of the monomers of formula (I) in combination with at least one monomer of formulae (II), (III) or (IV). In further embodiments the CTA can present at a level higher than 5 mol %; higher than 10 mol %; higher than 20 mol %; higher than 30 mol %; or higher than 40 mol %.

Accordingly, there is also provided a reaction composition comprising:
  one or more monomers of formula (I);
  at least one second monomer selected from the group consisting of:
    a monomer of formula (II),
    a monomer of formula (III), and
    a monomer of formula (IV);
  an organo-transition metal compound; and
  optionally a chain transfer agent of formula (IX).

Any of the monomers of formulae (I), (II), (III) and (IV) as described herein can be employed in this aspect of the reaction composition of this invention. As also described herein any of the organo-transition metal compound can be used in the reaction composition of this invention which facilitates vinyl addition polymerization reaction to form the vinyl addition polymer of this invention.

In one of the embodiments of this invention the reaction composition of this invention comprises an organo-transition metal compound which is organotransition compound as either as an unicomponent or bicomponent system as described herein. As already noted above any of the known palladium or nickel compounds can be employed in the reaction composition of this invention.

As noted, the polymerization reactions can be carried out neat, i.e., under mass polymerization conditions. That is, by practice of the instant invention it is now possible to make a variety of polymers containing at least one functionalized norbornene monomer (i.e., a compound of formula (I)) in combination with at least one monomer of formulae (II), (III) or (IV) in the presence of a chain transfer agent. As noted, the polymerizations are generally carried out in the presence of an organo-transition metal compound, such as for example, palladium or nickel compound as described herein, which brings about the vinyl addition polymerization reaction.

It has also been found that the organo-transition metal compounds as described herein either as unicomponent or bicomponent compositions as described herein are highly active. Thus it is now possible to make polymers of high quality by employing small amounts of these compounds as polymerization initiators. Accordingly, in one of the embodiments the addition polymerization can effectively be carried out using monomer to unicomponent initiator molar ratio of at least 100:1 based on the total moles of monomers and the initiator employed. That is, 100 moles of monomer to one mole of the unicomponent initiator is employed. In other embodiments the molar ratio of monomer:initoator can be 1,000,000:1; 500,000:1; 100,000:1; 20,000:1; 10,000:1, 5,000:1, 500:1, 400:1, 200:1, and the like. When bicomponent initiator systems are employed the molar ratio of monomer:initiator:activator can be at least 100:1:1. In other embodiments the molar ratio of monomer:initiator:activator can be 1,000,000:1:1; 500,000:1:1; 100,000:1:1; 20,000:1:1; 10,000:1:1, 1,000:1:1, 500:1:1, 400:1:1, 200:1:1, and the like. In some embodiments the activator is used in excess of the mole quantities of the initiator used, such as for example, molar ratios of initiator:activator can be from 1:1 to 1:6.

As noted, the mass polymerization reaction can be carried out with catalyst and monomer without any solvent. Advantageously, such polymerization reactions can also be carried out in a mold at a suitable temperature to form three dimensional polymeric products. In general, the reaction temperatures can range from sub-ambient temperature, such as for example, below 0° C. to boiling point of the monomers, however, it is recommended that the components of the reaction vessel or the mold is not heated beyond the flash points of one or more of the monomers. Generally, the mass polymerization is carried out at a temperature range from about 10° C. to 300° C., in some other embodiments the temperature range can be from about 10° C. to 200° C.; or from about 20° C. to 100° C.

Since the polymerization reaction is exothermic, the temperature in the mold during the course of the polymerization is usually higher than the temperature of the feed, unless a chilled mold is employed. Accordingly, the initial mold temperature can generally be within the range of about −20° C. to about 300° C.; or from about 0° C. to about 200° C.; or from 20° C. and 100° C. Temperature distribution in the mold is affected by such factors as mold geometry, characteristics of the mold as a heat sink or heat supplying means, reactivity of catalyst and monomer, and the like. To some extent, the selection of suitable temperatures and heat exchange conditions will have to be based on experience with a given system of mold, feed and catalyst.

After the polymerization reaction is complete, the molded object may be subjected to an additional post cure treatment at a temperature in the range of about 60° C. to 300° C. for about 15 minutes to 24 hours; or 1 to 2 hours. Such a post cure treatment can enhance polymeric properties including glass transition temperature ($T_g$) and heat distortion temperature (HDT). In addition, postcuring is desirable but not essential, to bring the samples to their final stable dimensional states, to minimize residual odors, and to improve final physical properties.

Advantageously, it has now been found that the mass polymerization of the reaction compositions of this invention can conveniently be carried out by heating the composition in stages: first heating the reaction composition to a temperature of from about 60° C. to 110° C. and maintaining at that temperature for some time, for example from about 5 minutes to 1 hour; and then heating the composition to a second temperature of from about 110° C. to 140° C. and maintaining at that temperature for some time, for example from about 5 minutes to 1 hour.

In some other embodiments it has also been found that carrying out the mass polymerization in more than two gradient temperature offers better polymerized product. Accordingly, in one of the embodiments the polymerization is carried out by heating the reaction composition of this invention in four incremental temperature ranges as follows: first heating the reaction composition to a temperature of from about 40° C. to 60° C. and maintaining at that temperature for about 5 minutes to 1 hour; then heating the composition to a second temperature of from about 60° C. to 80° C. and maintaining at that temperature for about 5 minutes to 1 hour; then heating the composition to a third temperature of from about 80° C. to 100° C. and maintaining at that temperature for about 5 minutes to 1 hour; and finally heating the composition to a fourth temperature of from about 100° C. to 120° C. and maintaining at that temperature for about 5 minutes to 1 hour. However, it should be noted that any of the other temperature and time conditions can also be employed to form polymers from the reaction compositions of this invention and of such conditions are within the scope of this invention.

The polymers formed according to this invention generally exhibit a weight average molecular weight ($M_w$) of at least about 3,000. In another embodiment, the polymer of this invention has a $M_w$ of at least about 5,000. In another embodiment, the polymer of this invention has a $M_w$ of at least about 10,000. In another embodiment, the polymer of this invention has a $M_w$ of at least about 20,000. In yet another embodiment, the polymer of this invention has a $M_w$ of at least about 50,000. In some other embodiments, the polymer of this invention has a $M_w$ of at least about 100,000. In another embodiment, the polymer of this invention has a $M_w$ of higher than 100,000 and can be higher than 500,000 in some other embodiments. The weight average molecular weight ($M_w$) of the polymers can be determined by any of the known techniques, such as for example, by gel permeation chromatography (GPC) equipped with suitable detector and calibration standards, such as differential refractive index detector calibrated with narrow-distribution polystyrene standards. The polydispersity index (PDI), which is a ratio of weight average molecular weight ($M_w$) to number average molecular weight ($M_n$) can also be measured from this method.

In another aspect of this invention there is also provided a method of mass polymerizing polycyclic olefin monomers comprising:

combining one or more monomers of formula (I):

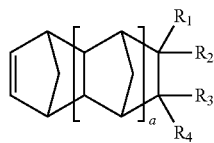

(I)

wherein:
ᶸᶸᶸ denotes a place of bonding with another repeat unit;
a is an integer 0, 1 or 2;
$R_1$, $R_2$, $R_3$ and $R_4$ are the same or different and each independently of one another is selected from hydrogen, linear or branched ($C_1$-$C_{16}$)alkyl, hydroxy($C_1$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, perfluoro($C_6$-$C_{10}$)aryl, perfluoro($C_6$-$C_{10}$)aryl($C_1$-$C_3$)alkyl, di($C_1$-$C_2$)alkylmaleimide($C_3$-$C_6$)alkyl, di($C_1$-$C_2$)alkylmaleimide($C_2$-$C_6$)alkoxy($C_1$-$C_2$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_5$-$C_{10}$)heteroaryloxy($C_1$-$C_3$)alkyl, ($C_6$-$C_{10}$)aryloxy, ($C_5$-$C_{10}$)heteroaryloxy, ($C_1$-$C_6$)acyloxy, where each of the aforementioned substituents are optionally substituted with a group selected from halogen or hydroxy; and at least one second type of monomer selected from the group consisting of:

a monomer of formula (II):

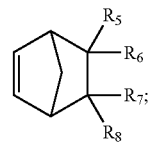

(II)

wherein:
at least one of $R_5$, $R_6$, $R_7$ and $R_8$ independently represents a group of formula (A):

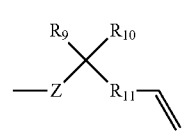

(A)

wherein:
Z is selected from —CO—O—, —O—CO— and —O—CO—O—;
$R_9$ and $R_{10}$ are the same or different and each independently of one another is selected from linear or branched ($C_1$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, perfluoro($C_6$-$C_{10}$)aryl and perfluoro($C_6$-$C_{10}$)aryl($C_1$-$C_3$)alkyl;
$R_{11}$ is selected from substituted or unsubstituted ($C_1$-$C_6$)alkylene, ($C_6$-$C_{10}$)arylene ($C_6$-$C_{10}$)aryl($C_2$-$C_6$)alkylene and ($C_2$-$C_6$)alkyl($C_6$-$C_{10}$)arylene;
remaining one or more of $R_5$, $R_6$, $R_7$ and $R_5$ independently represents hydrogen, linear or branched ($C_1$-$C_{12}$)alkyl, hydroxy($C_1$-$C_{12}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, perfluoro($C_6$-$C_{10}$)aryl, perfluoro($C_6$-$C_{10}$)aryl($C_1$-$C_3$)alkyl, ($C_5$-$C_{10}$)heteroaryl, ($C_5$-$C_{10}$)heteroaryl($C_1$-$C_3$)alkyl, hydroxy, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_5$-$C_{10}$)heteroaryloxy($C_1$-$C_3$)alkyl, ($C_6$-$C_{10}$)aryloxy, ($C_5$-$C_{10}$)heteroaryloxy, ($C_1$-$C_6$)acyloxy and halogen;
a monomer of formula (III):

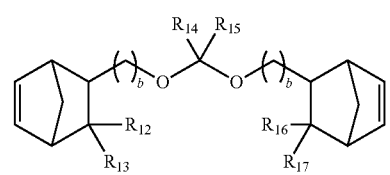

(III)

wherein:
b is an integer from 2 to 6;
$R_{12}$, $R_{13}$, $R_{16}$ and $R_{17}$ are the same or different and each independently of one another is selected from hydrogen, linear or branched ($C_1$-$C_{16}$)alkyl, hydroxy($C_1$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, perfluoro($C_6$-$C_{10}$)aryl, perfluoro($C_6$-$C_{10}$)aryl($C_1$-$C_3$)alkyl, di($C_1$-$C_2$)alkylmaleimide($C_3$-$C_6$)alkyl, di($C_1$-$C_2$)alkylmaleimide($C_2$-$C_6$)alkoxy($C_1$-$C_2$)alkyl, hydroxy, ($C_1$-$C_{12}$)alkoxy, ($C_3$-$C_{12}$)cycloalkoxy, ($C_6$-$C_{12}$)bicycloalkoxy, ($C_1$-$C_{14}$)tricycloalkoxy, ($C_6$-$C_{10}$)aryloxy($C_1$-$C_3$)

alkyl, $(C_5-C_{10})$heteroaryloxy$(C_1-C_3)$alkyl, $(C_6-C_{10})$aryloxy, $(C_5-C_{10})$heteroaryloxy, $(C_1-C_6)$acyloxy, where each of the aforementioned substituents are optionally substituted with a group selected from halogen or hydroxy; and $R_{14}$ and $R_{15}$ are the same or different and each independently of one another is selected from linear or branched $(C_1-C_{16})$ alkyl, perfluoro$(C_1-C_{12})$alkyl, $(C_3-C_{12})$cycloalkyl, $(C_6-C_{12})$ bicycloalkyl, $(C_7-C_{14})$tricycloalkyl, $(C_6-C_{10})$aryl, $(C_6-C_{10})$ aryl$(C_1-C_3)$alkyl, perfluoro$(C_6-C_{10})$aryl and perfluoro$(C_6-C_{10})$aryl$(C_1-C_3)$alkyl; and a monomer of formula (IV):

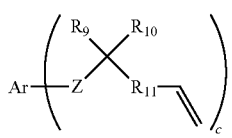

(IV)

wherein:

c is an integer from 2 to 6;

Ar is $(C_6-C_{10})$aryl; and

Z, $R_9$, $R_{10}$ and $R_{11}$ are as defined above;

with one or more chain transfer agent which is selected from the group consisting of:

($C_2-C_{16}$)alkene;
($C_3-C_{16}$)cycloalkene; and
($C_7-C_{16}$)bicycloalkene; and an organo-transition metal compound to form a mixture; and polymerizing the mixture to form a polymer.

As noted, one or more compounds of formula (I) as described herein can be combined with at least one monomer selected from monomers of formulae (II), (III) and (IV), such as the ones described herein in the presence of one or more of an organo-transition compounds and a CTA as described herein to form the polymers under mass vinyl addition polymerization conditions as described herein. Any of the known reaction conditions can be employed to form such polymers, including the temperature and "in mold" conditions described hereinabove.

In a further aspect of this invention the vinyl addition polymers of this invention exhibit excellent flame retardant property and are therefore useful as flame retardant materials and find utility in a variety of applications where such flame retardant materials can be employed. The polymers of this invention can thus be employed as such in certain of the applications including electronic and optoelectronic applications among others. The polymers can be fabricated in accordance with the intended applications such as for example as films, sheets, molded articles and the like. In addition, the flame retardant effects of the polymers of this invention can further be exploited by incorporating various other compatible materials including without any limitations, perhalocompounds such as perbromo compounds, silica, and various other fillers. The composite materials can be formed by any of the methods known in the art, such as for example, melt blending and/or solution blending and the like.

Accordingly, there is further provided a flame retardant material comprising the polymer of this invention.

In a further aspect of this invention there is also provided a flame retardant material comprising the reaction composition of this invention. In this aspect of the invention the flame retardant material can be made directly "in mold" or "bulk" techniques using one or more monomers of formula (I) with at least one monomer of formulae (II), (III) and (IV) in the presence of a CTA and an organo-transition compound. In addition, various other additives as described herein can be mixed with the reaction composition of this invention to form the flame retardant materials of this invention.

The following examples are detailed descriptions of methods of preparation and use of certain compounds/monomers, polymers and compositions of the present invention. These are illustrative examples of the present invention and are provided for illustration purposes and in no way limit the scope of the present invention. The detailed preparations fall within the scope of, and serve to exemplify, the more generally described methods of preparation set forth above. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:

DecNB: 5-decylbicyclo[2.2.1]hept-2-ene; HexNB—5-hexylbicyclo-[2.2.1]hept-2-ene; PENB—5-phenethylbicyclo [2.2.1]hept-2-ene; NBDMOC—2,6-dimethyloct-7-en-2-yl 3,3-dimethylbicyclo[2.2.1]hept-5-ene-2-carboxylate; (NBEtO)$_2$CMe$_2$—5,5'-((propane-2,2-diylbis(oxy))bis(ethane-2,1-diyl)bis(bicyclo[2.2.1]-hept-2-ene); NBEtOH—2-(bicyclo[2.2.1]hept-5-en-2-yl)ethan-1-ol; HexenylNB—5-(hex-5-en-1-yl)bicyclo[2.2.1]hept-2-ene; NB-Bu-NB—1,4-di(bicyclo[2.2.1]hept-5-en-2-yl)butane; (DMOBC)$_4$—tetrakis(2,6-dimethyloct-7-en-2-yl) benzene-1,2,4,5-tetracarboxylate; Ru-848—[1,3-bis(2,4,6-trimethylphenyl)-2-imidazolidinylidene]-[2-[[(2-methylphenyl)imino] methyl]-phenolyl]chloro-(3-phenyl-indenylidene)ruthenium (II); BCO—bicyclo[4.2.0]oct-7-ene; DANFABA—N,N-dimethylaniliniumtetrakis(pentafluorophenyl)-borate; LiFABA—lithium tetrakis(pentafluoro-phenyl)borate; DMF dimethylformamide; THF—tetrahydrofuran; DMAP—4-dimethylaminopyridine; CTA—chain transfer agent; GPC—gel permeation chromatography; $M_w$—weight average molecular weight; PD polydispersity; $^1$H NMR proton nuclear magnetic resonance spectroscopy.

Monomers

The following examples describe the procedures used for the preparation of various monomers used to form the polymers of this invention.

Example A

NBDMOC

Into a suitably sized reaction vessel were placed 2,6-dimethyl-7-octene-2-ol (67.7 grams, 0.43 mol), pyridine (200 mL) and DMAP (0.54 gram, 4.4 mmol). 5-Norbornene-2-carbonyl chloride (67.7 grams, 0.43 mol) was added to the solution at room temperature as neat. Exotherm was observed. The reaction mixture was heated up to 65° C. in an oil bath and stirred at this temperature for 17 hours. Heating was stopped and the formed salts were filtered off and washed with toluene. After evaporation of pyridine and toluene, water was added to the crude product, then extracted with diethyl ether. The organic layer was washed with water, a saturated sodium chloride aqueous solution and a saturated sodium carbonate aqueous solution, successively. The aqueous layer was extracted with diethyl ether. Combined organic layer was dried over magnesium sulfate. After rotary evaporating solvents, the crude product 115 grams was vacuum distilled by short path distillation to afford 104 grams of the title compound (87% yield, b.p.: 95-102° C./30 mTorr).

Example B

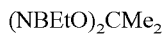

The title compound was prepared essentially following the procedures as set forth in Organic Syntheses, Coll. Vol. 5, p. 5 (1973); Vol. 42, p. 1 (1962) and as described below.

Endo/exo-NBEtOH (292 grams, 2.1 mol), acetone dimethyl acetal (100.2 grams, 0.96 mol), hexanes (300 mL) and p-toluenesulfonic acid monohydrate (0.88 gram, 4.63 mmol) were measured and transferred into a flask equipped with a Dean-Sterk apparatus. The reaction mixture was heated up in a 80° C. oil bath. After receiving about 200 mL of distillate, 200 mL of hexanes was added. When about 30 grams of MeOH was recovered, the heating was stopped. The solvent was evaporated under reduced pressure, and the crude mixture was vacuum distilled twice to obtain the title compound (101 grams, 33% yield, 55° C./30 mTorr).

Example C

Pyromellitic dianhydride (20 grams, 92 mmol) and DMF were measured and placed in a flask. Dihydromyrcenol (28.7 grams, 183.5 mmol) was added to the mixture in the flask. The resulting mixture was heated on an oil bath at 40° C. and kept stirring at this temperature for 20 hours. The reaction mixture was an orange homogeneous solution. N,N'-Carbonyldiimidazole (29.9 grams, 184.2 mmol) was added to this orange solution as solid. Evolution of gas was observed. 1,8-Diazabicycloundec-7-ene (28 grams, 183.8 mmol) and dihydromyrcenol (51.2 grams, 327.7 mmol) were added to the reaction mixture. The reaction mixture turned to wine red. The reaction was checked on a TLC plate. The oil bath temperature was changed to 50° C. and kept stirring at this temperature for 48 hours. The heating was stopped by removing the oil bath. The reaction mixture was then poured into water. Diethyl ether and ethyl acetate were used to extract the crude products. The organic layer was washed with brine. The organic layer was dried over magnesium sulfate and the solvents were rotary evaporated. The crude product of 92 grams was recovered. The crude products were purified by column chromatography with gradient elution from hexane to hexane/ethyl acetate=20/1. The targeted material of 23.61 grams was obtained which contained residual dihydromyrcenol. The chromatographed product was vacuum distilled at 70° C./0.1 torr to remove dihydromyrcenol and to the title compound (18, grams, 24% yield).

The following examples describe the procedures used for the preparation of various polymers as disclosed herein. However, it should be noted that these examples are intended to illustrate the disclosure without limiting the scope thereof.

The following Examples 1 to 5 illustrate the mass polymerization of DecNB alone under vinyl addition polymerization conditions, the resulting polymer still exhibited good flame retardant property.

Examples 1-5

Homopolymer of DecNB

Examples 1-4

The following Examples 1-4 demonstrate the effects of various levels of BCO and the palladium initiator on polymer's molecular weight and the flame retardant property.

Into a suitable reactor purged with nitrogen were placed 5,000 or 10,000 parts of DecNB, one part of palladium compound (AcO—Pd—NCCH$_3$(P-i-Pr$_3$)$_2$B(C$_6$F$_5$)$_4$) and 2 parts of DANFABA. To this mixture was then added two different amounts of BCO 2.5 or 5 mole percent based on the amount of monomer employed, as summarized in Table 1. The reaction mixture was then poured into Teflon coated aluminum mold and heated in stages first at 50° C. and maintained at this temperature for 30 minutes, then heated to 65° C. and maintained at that temperature for 30 minutes, then heated to 85° C. and maintained at that temperature for 30 minutes, and finally heated to 110° C. and maintained at that temperature for 30 minute. After which time the reaction mixture was allowed to cool to room temperature. Then the molded articles in each of Examples 1 to 4 were removed from the Teflon coated aluminum mold and were characterized by GPC in THF, the M$_w$ and PD for each of the Examples 1 to 4 are summarized in Table 1. The samples were also tested for their flame retardant property in accordance with UL-94 test protocols and the results are summarized in Table 1 for each of the Examples 1 to 4.

TABLE 1

| Example No. | Mol % BCO | DecNB/Pd Compound/ DANFABA | GPC M$_w$/PD | Sample Thickness (mm) | UL-94 Rating (No. of test bars) | Comments |
|---|---|---|---|---|---|---|
| 1 | 2.5 | 5,000/1/2 | 56,000/4.8 | 2.1 | V-0 (3) | Flow dripping |
| 2 | 5 | 10,000/1/2 | 72,000/5.5 | 2.5 | V-0 (3) | Flow dripping |
| 3 | 5 | 10,000/1/2 | 57,000/4.6 | 2.1 | V-0 (3); V-2 (1) | Flow dripping |
| 4 | 2.5 | 10,000/1/2 | 153,000/6.2 | 2.1 | V-2 (4) | Dripping flames |

Figure 2:
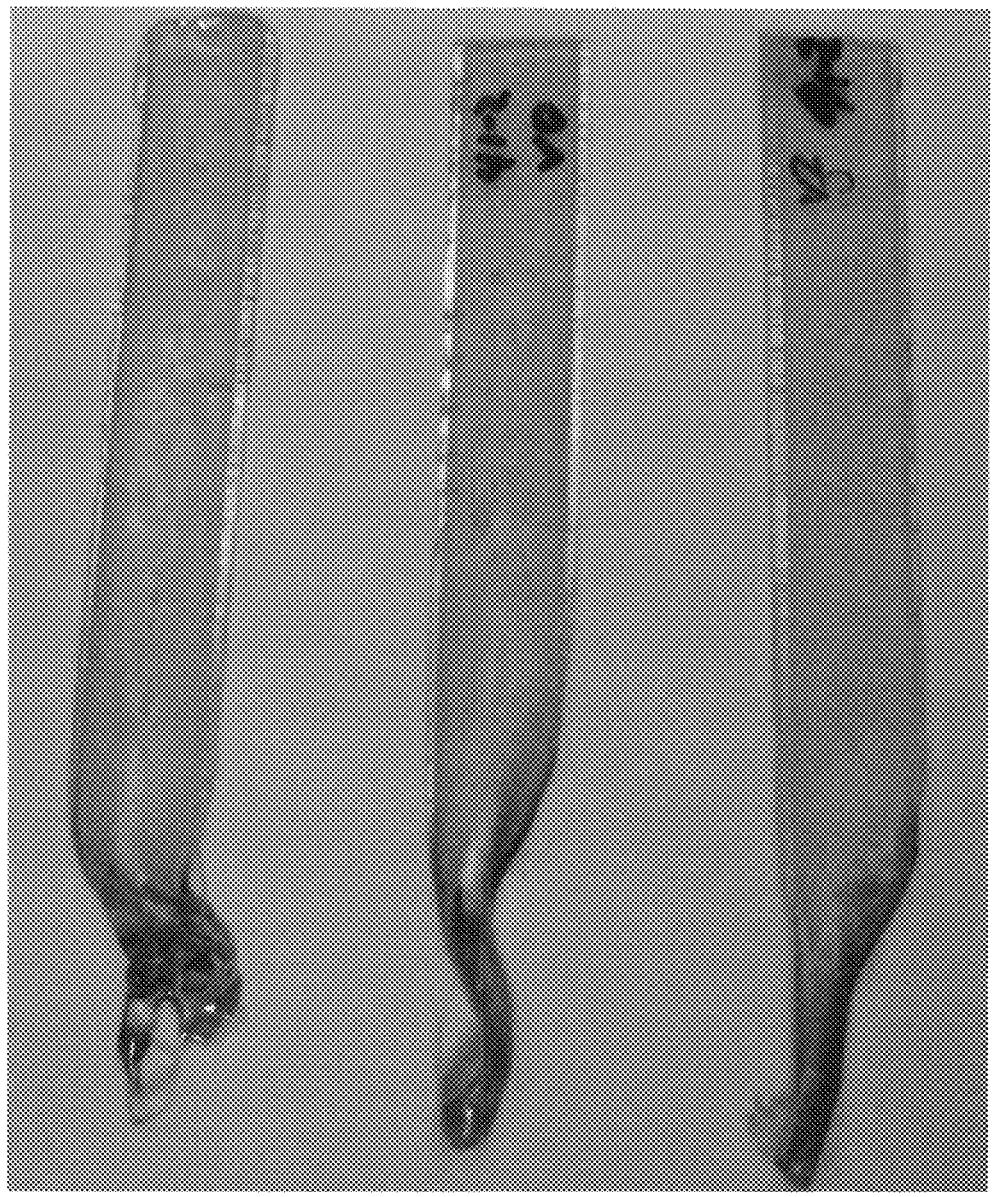
FIG. 2 shows a photograph of a flame retardant test performed on a polymer embodiment (polyDecNB) of this invention.

It is evident from the above results that the UL-94 burn test flame retardant results indicated that a V-0 rating can be achieved for samples containing 5 mol % BCO, i.e., polyDecNB of Examples 1 to 3. This is further shown in FIG. 2 which shows a photograph of the samples of Example 3 used in a flammability test performed in accordance with UL-94 test protocols. The polymer of Example 4, which contained only 2.5 mol % BCO resulted only in flame retardancy rating of V-2.

Examples 5-6

The procedures of Examples 1 to 4 were substantially repeated in Examples 5 and 6 except that HexNB was used instead of DecNB. The results are summarized in Table 2.

TABLE 2

| Example No. | Mol % BCO | DecNB/Pd Compound/ DANFABA | GPC $M_w$/PD | Sample Thickness (mm) | UL-94 Rating (No. of test bars) | Comments |
|---|---|---|---|---|---|---|
| 5 | 5 | 10,000/1/2 | 53,700/4.2 | 2.7 | V-2 (3) | Dripping flames |
| 6 | 7.5 | 10,000/1/2 | 30,800/4.8 | 2.4 | V-2 (3) | Dripping flames |

Figure 3:
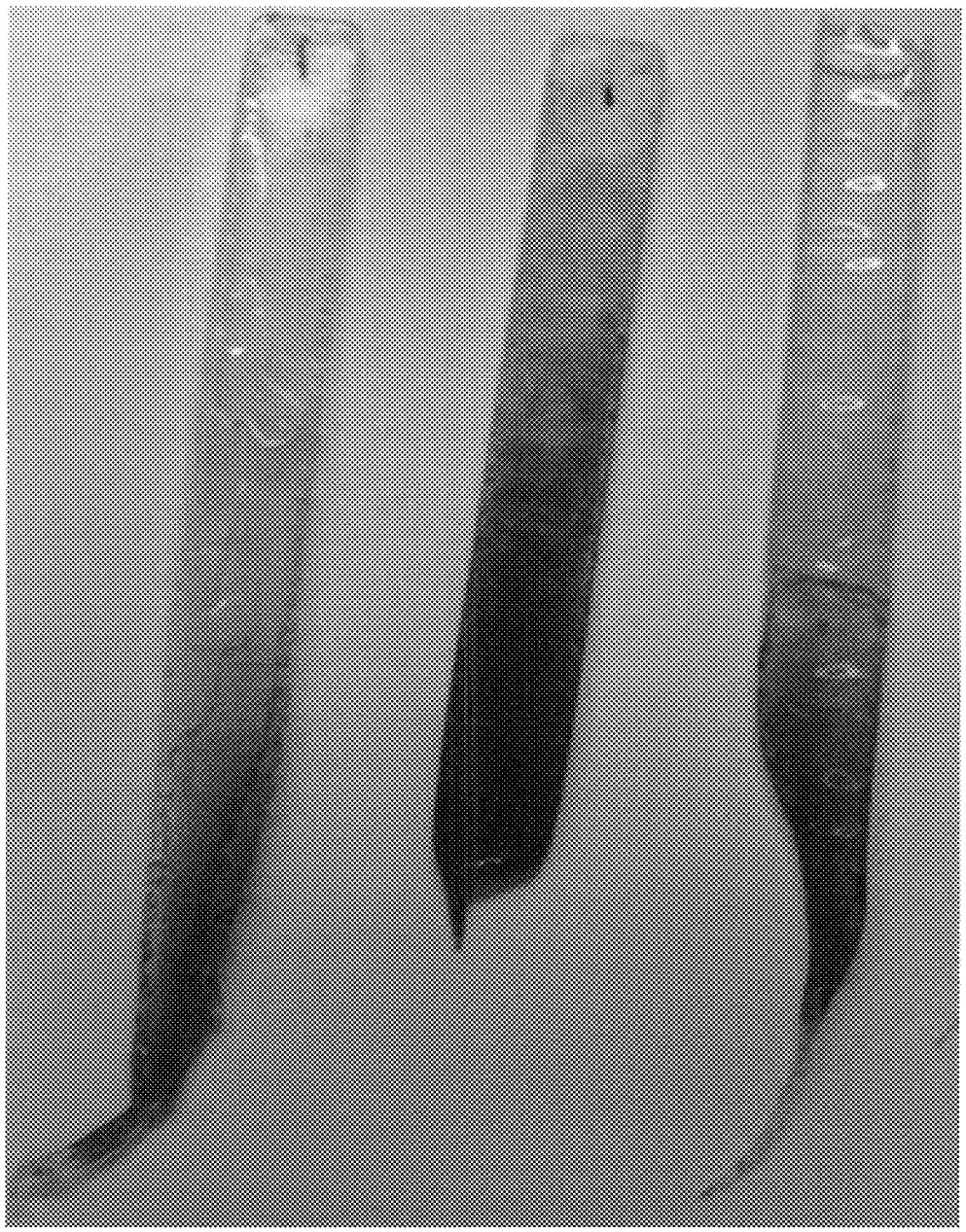
FIG. 3 shows a photograph of a flame retardant test performed on a polymer embodiment (polyHexNB) of this invention.

FIG. 3 shows a photograph of the samples of Example 5 used in a flammability test performed in accordance with UL-94 test protocols.

Examples 7-9

The procedures of Examples 1 to 4 were substantially repeated in Examples 7 to 9 except that PENB was used instead of DecNB. The results are summarized in Table 3.

TABLE 3

| Example No. | Mol % BCO | DecNB/Pd Compound/ DANFABA | GPC $M_w$/PD | Sample Thickness (mm) | UL-94 Rating (No. of test bars) | Comments |
|---|---|---|---|---|---|---|
| 7 | 2.5 | 10,000/1/2 | 43,000/4.6 | 2.8 | V-2 (3) | Dripping flames |
| 8 | 3.75 | 10,000/1/2 | 30,800/4.6 | 2.7 | V-0 (5) | Flow dripping |
| 9 | 5 | 10,000/1/2 | 20,300/4.8 | 2.7 | V-0 (5) | Flow dripping |

Figure 4:
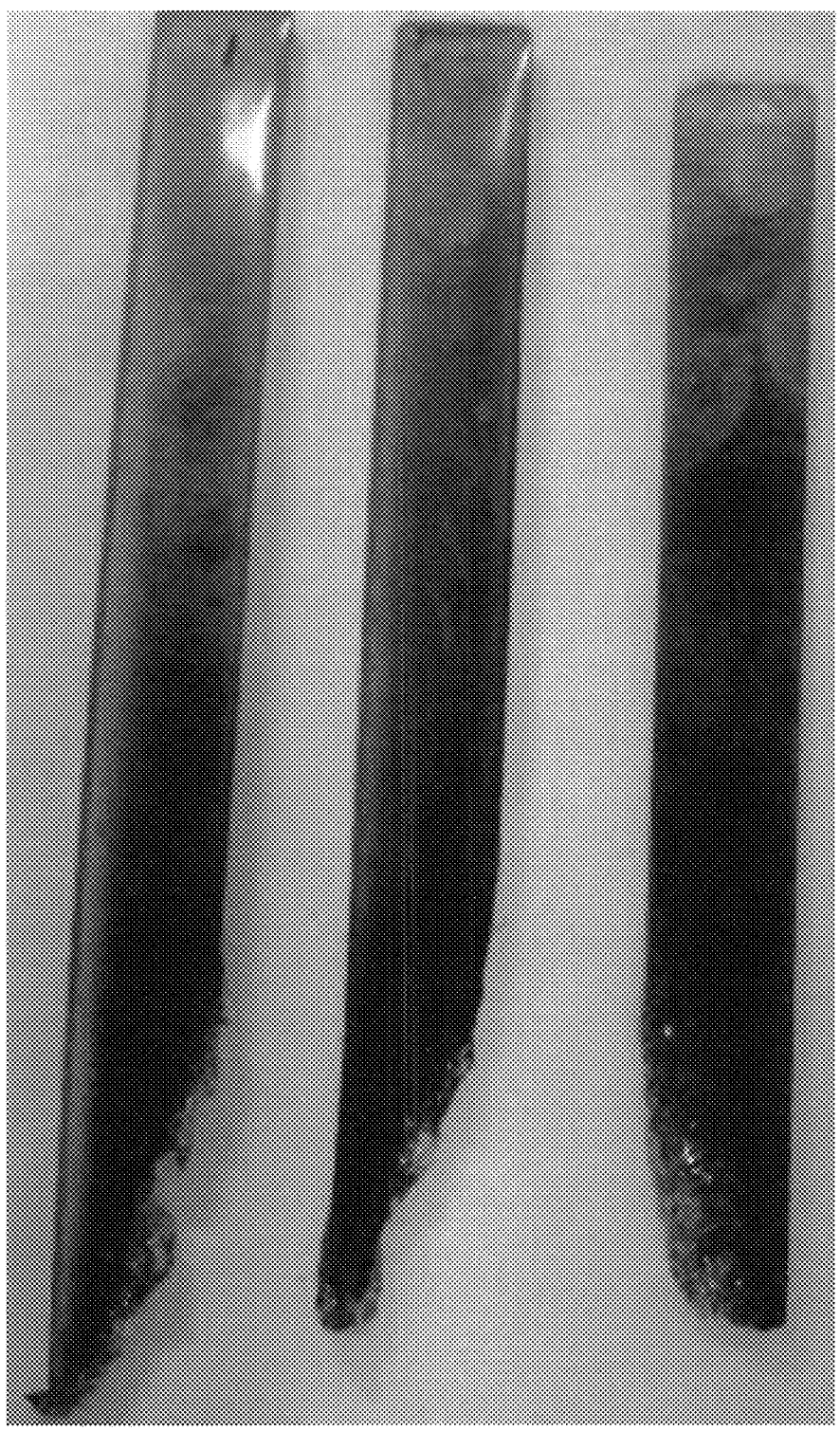
FIG. 4 shows a photograph of a flame retardant test performed on a polymer embodiment (polyPENB) of this invention.

FIG. 4 shows a photograph of the samples of Example 8 used in a flammability test performed in accordance with UL-94 test protocols.

Examples 10-14

The procedures of Examples 1 to 4 were substantially repeated in Examples 10 to 18 except that DecNB was used along with $(NBEtO)_2CMe_2$. In all of these Examples 10-14 the molar ratio of DecNB/palladium compound/DANFABA was 10,000/1/2. The results are summarized in Table 4.

TABLE 4

| Example No. | Mol % BCO | Mol % $(NBEtO)_2CMe_2$ or NB—Bu—NB | Sample Thickness (mm) | UL-94 Rating (No. of test bars) | Comments |
|---|---|---|---|---|---|
| 10 | 5 | 7.5 $(NBEtO)_2CMe_2$ | 2.3 | V-2 (3) | Dripping flames |
| 11 | 7.5 | 5 $(NBEtO)_2CMe_2$ | 2.5 | V-0 (3) | Flow dripping |
| 12 | 7.5 | 7.5 $(NBEtO)_2CMe_2$ | 2.6 | V-2 (3) | Dripping flames |
| 13 | 5 | 6 $(NBEtO)_2CMe_2$ | 2.4 | V-2 (3) | Dripping flames |
| 14 | 7.5 | 5 $(NBEtO)_2CMe_2$ | 1.8 | V-0 (3) | Flow dripping |
| Comp. Ex. 1 | 7.5 | 6 NB—Bu—NB | 2.5 | V-2 (3) | Dripping flames |
| Comp. Ex. 2 | 7.5 | 5 NB—Bu—NB | 2.8 | NR (3) | Burnt furiously |
| Comp. Ex. 3 | 7.5 | 3 NB—Bu—NB | 2.5 | NR (2) | Burnt furiously |
| Comp. Ex. 4 | 7.5 | 1 NB—Bu—NB | 2 | NR (2) | Burnt furiously |

It is evident from the results summarized in Table 4 that the polymers of this invention generally exhibit excellent flame retardant property and with the samples tested the flame retardancy rating of V-0 was achieved in Examples 11 and 14, and Examples 10, 12 and 13 exhibited a flame retardancy rating of V-0. Whereas the Comparative Examples 1 to 4 which contained a NB-Bu-NB as the crosslinking moiety exhibited poor flame retardancy property in that only Comparative Example 1 exhibited a flame retardancy rating of V-2, and Comparative Examples 2-3 burnt furiously thus resulting in no UL-94 rating.

Examples 15-20

The procedures of Examples 1 to 4 were substantially repeated in Examples 10 to 18 except that PENB was used along with $(NBEtO)_2CMe_2$. In all of these Examples 15-20 the molar ratio of PENB/palladium compound/DANFABA was 10,000/1/2. The results are summarized in Table 5.

TABLE 5

| Example No. | Mol % BCO | Mol % $(NBEtO)_2CMe_2$ | Sample Thickness (mm) | UL-94 Rating (No. of test bars) | Comments |
|---|---|---|---|---|---|
| 15 | 5 | 2.5 | 2.4 | V-0 (1) | Flow dripping |
|  |  |  |  | V-2 (3) | Dripping flames |
| 16 | 5 | 4 | 2.5 | V-2 (3) | Dripping flames |
| 17 | 5 | 5 | 2.3 | V-2 (5) | Dripping flames |
| 18 | 3.75 | 3 | 2.5 | V-2 (3) | Dripping flames |
| 19 | 7.5 | 3 | 2.7 | V-0 (3) | Flow dripping |
|  |  |  |  | V-2 (1) | Dripping flames |
| 20 | 7.5 | 5 | 2.2 | V-0 (2) | Flow dripping |
|  |  |  |  | V-2 (3) | Dripping flames |

The data summarized in Table 5 further confirms the fire retardant efficacy of the polymers made in accordance with this invention as exemplified in Examples 15-20. More specifically, the polymers of Example 19, which contained only 3 mol % crosslinker containing thermally labile acetal group, $(NBEtO)_2CMe_2$, and 7.5 mol % BCO gave V-0 (3 test bars)/V-2(1 test bar), which is remarkably good result. The polymer of Example 20 which contained 5 mol % crosslinker, $(NBEtO)_2CMe_2$, and 7.5 mol % BCO gave V-0 (2 test bars)/V-2 (3 test bars), which is also a very good result. The inconsistency in fire retardant (FR) property may perhaps be due to difficulty in controlling the low $M_w$ fragments and amount of thermally labile crosslinkable monomer, such as $(NBEtO)_2CMe_2$. It should further be noted that poly(PENB) ($T_g$=233° C. by DMA) has a higher $T_g$ compared to poly (DecNB) ($T_g$~142° C. by DMA). Therefore it is a surprising finding that a high $T_g$ polynorbornene polymer such as, (PENB) polymer when polymerized with a olefinic monomer containing thermally labile group such as $(NBEtO)_2$ $CMe_2$ can still demonstrate the flame retardant efficacy by employing a chain transfer agent to control the molecular weight.

Comparative Examples 1-4

The procedures of Examples 1 to 4 were substantially repeated in Comparative Examples 1 to 4 except that DecNB was used along with NB-Bu-NB. The results are summarized in Table 4.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A polymer comprising one or more first type of repeating units represented by formula (IA), said first type of repeating unit is derived from a monomer of formula (I):

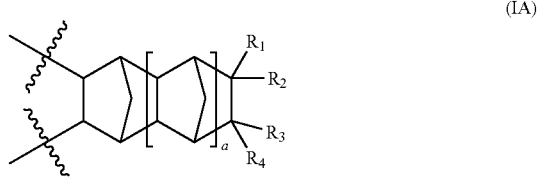

-continued

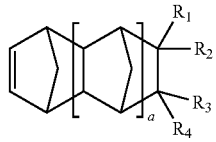

wherein:

⁓⁓⁓ denotes a place of bonding with another repeat unit;

a is an integer 0, 1 or 2;

$R_1$, $R_2$, $R_3$ and $R_4$ are the same or different and each independently of one another is selected from hydrogen, linear or branched ($C_1$-$C_{16}$)alkyl, hydroxy($C_1$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$) aryl, ($C_6$-$C_{10}$)aryl($C_1$-$C_3$)alkyl, perfluoro($C_6$-$C_{10}$)aryl, perfluoro($C_6$-$C_{10}$)aryl($C_1$-$C_3$)alkyl, di($C_1$-$C_2$)alkylmaleimide($C_3$-$C_6$)alkyl, di($C_1$-$C_2$)alkylmaleimide($C_2$-$C_6$) alkoxy($C_1$-$C_2$)alkyl, ($C_1$-$C_{12}$)alkoxy, ($C_3$-$C_{12}$)cycloalkoxy, ($C_6$-$C_{12}$)bicycloalkoxy, ($C_1$-$C_{14}$) tricycloalkoxy, ($C_6$-$C_{10}$)aryloxy($C_1$-$C_3$)alkyl, ($C_5$-$C_{10}$) heteroaryloxy($C_1$-$C_3$)alkyl, ($C_6$-$C_{10}$)aryloxy, ($C_5$-$C_{10}$) heteroaryloxy, and ($C_1$-$C_6$)acyloxy, where each of the aforementioned substituents are optionally substituted with a group selected from halogen or hydroxy; and at least one second type of repeat unit derived from one of the monomers selected from the group consisting of:

a monomer of formula (II):

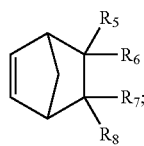

(II)

wherein:
at least one of $R_5$, $R_6$, $R_7$ and $R_8$ independently represents a group of formula (A):

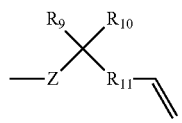

(A)

wherein:
Z is selected from —CO—O—, —O—CO— and —O—CO—O—;
$R_9$ and $R_{10}$ are the same or different and each independently of one another is selected from linear or branched $(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl;
$R_{11}$ is selected from substituted or unsubstituted $(C_1-C_6)$alkylene, $(C_6-C_{10})$arylene $(C_6-C_{10})$aryl$(C_2-C_6)$alkylene and $(C_2-C_6)$alkyl$(C_6-C_{10})$arylene;
remaining one or more of $R_5$, $R_6$, $R_7$ and $R_8$ independently represents hydrogen, linear or branched $(C_1-C_{12})$alkyl, hydroxy$(C_1-C_{12})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, $(C_5-C_{10})$heteroaryl, $(C_5-C_{10})$heteroaryl$(C_1-C_3)$alkyl, hydroxy, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, and $(C_1-C_6)$acyloxy and halogen;
a monomer of formula (III):

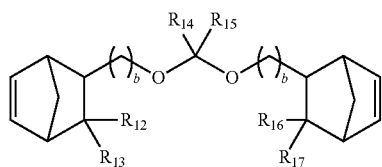

(III)

wherein:
b is an integer from 2 to 6;
$R_{12}$, $R_{13}$, $R_{16}$ and $R_{17}$ are the same or different and each independently of one another is selected from hydrogen, linear or branched $(C_1-C_{16})$alkyl, hydroxy$(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, di$(C_1-C_2)$alkylmaleimide$(C_3-C_6)$alkyl, di$(C_1-C_2)$alkylmaleimide$(C_2-C_6)$ alkoxy$(C_1-C_2)$alkyl, hydroxy, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, and $(C_1-C_6)$acyloxy, where each of the aforementioned substituents are optionally substituted with a group selected from halogen or hydroxy; and
$R_{14}$ and $R_{15}$ are the same or different and each independently of one another is selected from linear or branched $(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl; and
a monomer of formula (IV):

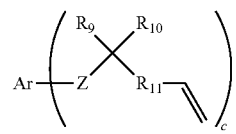

(IV)

wherein:
c is an integer from 2 to 6;
Ar is $(C_6-C_{10})$aryl; and
Z, $R_9$, $R_{10}$ and $R_{11}$ are as defined above.

2. The polymer of claim 1, wherein said one or more monomers of formula (I) is having:
a is 0 or 1;
at least one of $R_1$, $R_2$, $R_3$ and $R_4$ is selected from hydrogen, linear or branched $(C_1-C_{16})$alkyl, perfluoro $(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, and perfluoro $(C_6-C_{10})$aryl$(C_1-C_3)$alkyl; and
each of the remaining $R_1$, $R_2$, $R_3$ and $R_4$ is hydrogen.

3. The polymer of claim 1, wherein said one or more monomers of formula (I) is selected from the group consisting of:
bicyclo[2.2.1]hept-2-ene (NB);
norbornenyl-2-trifluoromethyl-3,3,3-trifluoropropan-2-ol (HFANB);
5-hexylbicyclo-[2.2.1]hept-2-ene (HexNB);
5-octylbicyclo[2.2.1]hept-2-ene (OctNB);
5-decylbicyclo[2.2.1]hept-2-ene (DecNB);
5-perfluorobutylbicyclo[2.2.1]hept-2-ene ($C_4F_9$NB);
5-phenethylbicyclo[2.2.1]hept-2-ene (PENB); and
2-(bicyclo[2.2.1]hept-5-en-2-yl)bicyclo[2.2.1]heptane (NBANB).

4. The polymer of claim 1, wherein said one or more monomers of formula (I) are at least two distinct types of monomers of formula (I).

5. The polymer of claim 1, wherein said polymer comprises one or more repeat units derived from corresponding monomers of formula (I) and a second type of repeat unit derived from a monomer of formula (II).

6. The polymer of claim 5, wherein said second type of repeat unit derived from a monomer of formula (II) is having:
Z is —CO—O—;
$R_9$ and $R_{10}$ are the same or different and each independently of one another is selected from linear or branched $(C_1-C_{10})$alkyl, perfluoro$(C_1-C_8)$alkyl, phenyl, naphthyl, benzyl, phenylethyl, perfluorophenyl and perfluorobenzyl;

$R_{11}$ is selected from substituted or unsubstituted $(C_2-C_4)$ alkylene and phenylene;

remaining one or more of $R_5$, $R_6$, $R_7$ and $R_8$ independently represents hydrogen, linear or branched $(C_1-C_{12})$alkyl, perfluoro$(C_1-C_{12})$alkyl, $(C_6-C_{10})$aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl.

7. The polymer of claim 6, wherein said second type of repeat unit is derived from a monomer of formula (II) selected from the group consisting of:

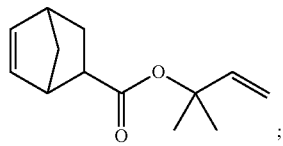

2-methylbut-3-en-2-yl bicyclo[2.2.1]hept-5-ene-2-carboxylate

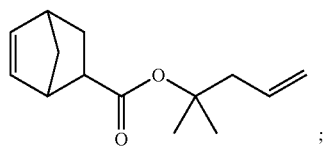

2-methylpent-4-en-2-yl bicyclo[2.2.1]hept-5-ene-2-carboxylate

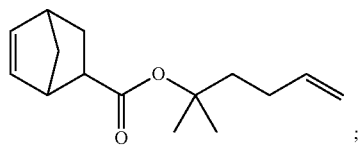

2-methylhex-5-en-2-yl bicyclo[2.2.1]hept-5-ene-2-carboxylate

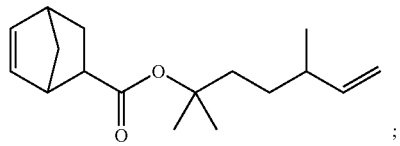

2,5-dimethylhept-6-en-2-yl bicyclo[2.2.1]hept-5-ene-2-carboxylate

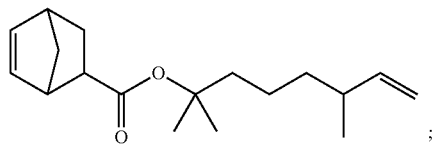

2,6-dimethyloct-7-en-2-yl bicyclo[2.2.1]hept-5-ene-2-carboxylate

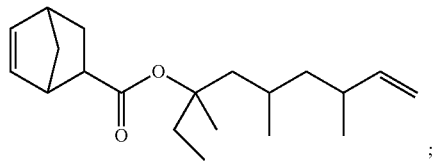

3,5,7-trimethylnon-8-en-3-yl bicyclo[2.2.1]hept-5-ene-2-carboxylate

-continued

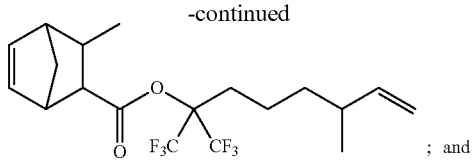

1,1,1-trifluoro-6-methly-2-(trifluoromethyl)oct-7-en-2-yl 3-methylbicyclo[2.2.1]hept-5-ene-2-carboxylate

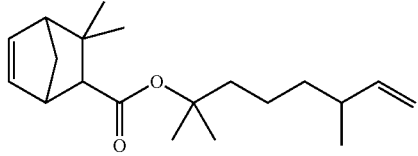

2,6-dimethyloct-7-en-2-yl 3,3-dimethylbicyclo[2.2.1]hept-5-ene-2-carboxylate

8. The polymer of claim 1, wherein said polymer comprises one or more repeat units derived from corresponding monomers of formula (I) and a second type of repeat unit derived from a monomer of formula (III).

9. The polymer of claim 8, wherein said second type of repeat unit derived from a monomer of formula (III) is having:

b is an integer from 2 to 4;

$R_{12}$, $R_{13}$, $R_{16}$ and $R_{17}$ are the same or different and each independently of one another is selected from hydrogen, linear or branched $(C_1-C_{12})$alkyl, perfluoro$(C_1-C_8)$alkyl, $(C_3-C_7)$cycloalkyl, $(C_6-C_9)$bicycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, and di$(C_1-C_2)$alkylmaleimide$(C_3-C_6)$alkyl, where each of the aforementioned substituents are optionally substituted with a group selected from halogen or hydroxy; and $R_{14}$ and $R_{15}$ are the same or different and each independently of one another is selected from linear or branched $(C_1-C_{12})$alkyl, perfluoro$(C_1-C_8)$alkyl, $(C_3-C_7)$cycloalkyl, $(C_6-C_{10})$aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl.

10. The polymer of claim 9, wherein said second type of repeat unit is derived from a monomer of formula (III) selected from the group consisting of:

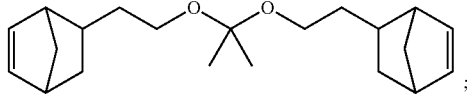

5,5'-((propane-2,2-diylbis(oxy))bis(ethane-2,1-diyl))bis(bicyclo[2.2.1]hept-2-ene)

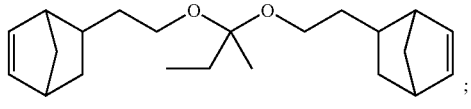

5,5'-((butane-2,2-diylbis(oxy))bis(ethane-2,1-diyl))bis(bicyclo[2.2.1]hept-2-ene)

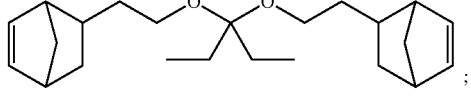

5,5'-((pentane-3,3-diylbis(oxy))bis(ethane-2,1-diyl))bis(bicyclo[2.2.1]hept-2-ene)

-continued

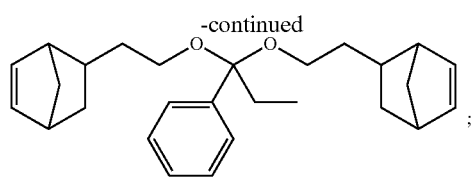

5,5'-(((1-phenylpropane-1,1-diyl)bis(oxy))bis
(ethane-2,1-diyl))bis(bicyclo[2.2.1]hept-2-ene)

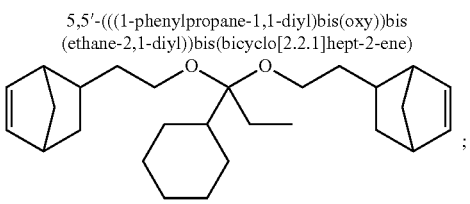

5,5'-(((1-cyclohexylpropane-1,1-diyl)bis(oxy))bis
(ethane-2,1-diyl))bis(bicyclo[2.2.1]hept-2-ene)

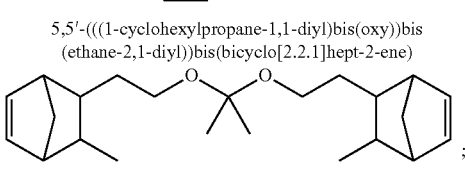

6,6'-((propane-2,2-diylbis(oxy))bis(ethane-2,1-diyl))
bis(5-methylbicyclo[2.2.1]hept-2-ene)

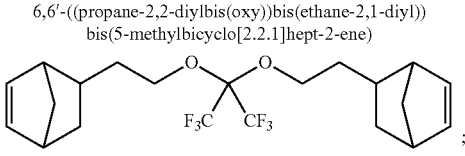

5,5'-(((perfluoropropane-2,2-diyl)bis(oxy))bis
(ethane-2,1-diyl))bis(bicyclo[2.2.1]hept-2-ene)

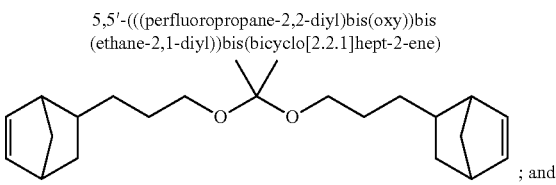

; and 5,5'-((propane-2,2-diylbis(oxy))bis(propane-
3,1-diyl))bis(bicyclo[2.2.1]hept-2-ene)

-continued

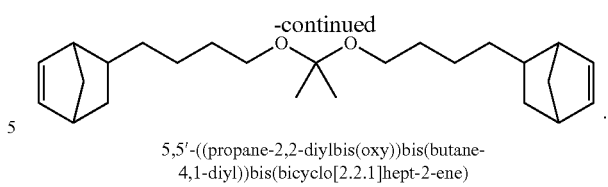

5,5'-((propane-2,2-diylbis(oxy))bis(butane-
4,1-diyl))bis(bicyclo[2.2.1]hept-2-ene)

11. The polymer of claim 1, wherein said polymer comprises one or more repeat units derived from corresponding monomers of formula (I) and a second type of repeat unit derived from a monomer of formula (IV).

12. The polymer of claim 8, wherein said second type of repeat unit derived from a monomer of formula (III) is having:

c is an integer from 2 to 4;

Ar is phenyl or naphthyl; and

Z is —CO—O—;

$R_9$ and $R_{10}$ are the same or different and each independently of one another is selected from linear or branched $(C_1-C_{10})$alkyl, perfluoro$(C_1-C_8)$alkyl, phenyl, naphthyl, benzyl, phenylethyl, perfluorophenyl and perfluorobenzyl;

$R_{11}$ is selected from substituted or unsubstituted $(C_2-C_4)$ alkylene and phenylene;

remaining one or more of $R_5$, $R_6$, $R_7$ and $R_8$ independently represents hydrogen, linear or branched $(C_1-C_{12})$alkyl, perfluoro$(C_1-C_{12})$alkyl, $(C_6-C_{10})$aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl.

13. The polymer of claim 12, wherein said second type of repeat unit is derived from a monomer of formula (IV) selected from the group consisting of:

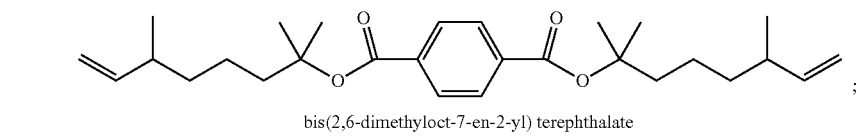

bis(2,6-dimethyloct-7-en-2-yl) terephthalate

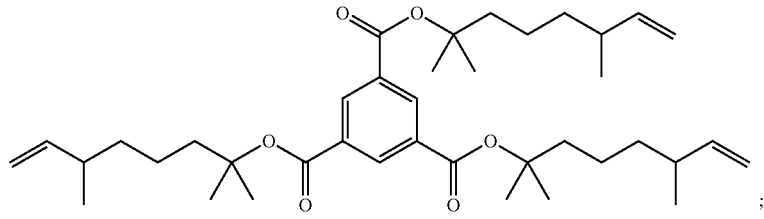

tris(2,6-dimethyloct-7-en-2-yl) benzene-1,3,5-tricarboxylate

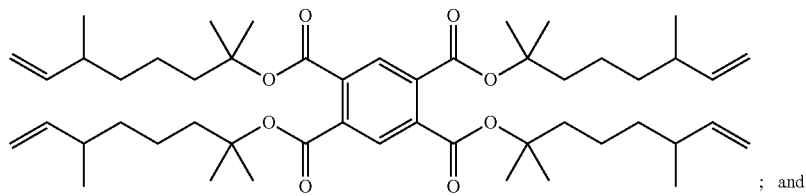

; and tetrakis(2,6-dimethyloct-7-en-2-yl) benzene-1,2,4,5-tetracarboxylate

-continued

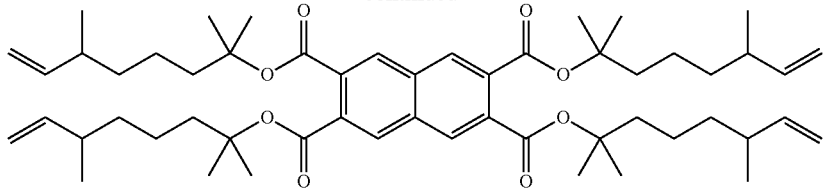

tetrakis(2,6-dimethyloct-7-en-2-yl) naphthalene-2,3,6,7-tetracarboxylate

14. A reaction composition comprising:
one or more monomers of formula (I):

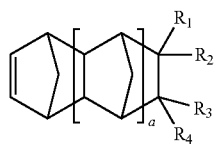

wherein:
a is an integer 0, 1 or 2;
$R_1$, $R_2$, $R_3$ and $R_4$ are the same or different and each independently of one another is selected from hydrogen, linear or branched $(C_1-C_{16})$alkyl, hydroxy$(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, di$(C_1-C_2)$alkylmaleimide$(C_3-C_6)$alkyl, di$(C_1-C_2)$alkylmaleimide$(C_2-C_6)$alkoxy$(C_1-C_2)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, and $(C_1-C_6)$acyloxy, where each of the aforementioned substituents are optionally substituted with a group selected from halogen or hydroxy; and
at least one second monomer selected from the group consisting of:
a monomer of formula (II):

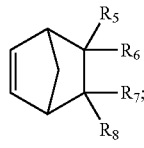

wherein:
at least one of $R_5$, $R_6$, $R_7$ and $R_8$ independently represents a group of formula (A):

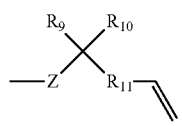

wherein:
Z is selected from —CO—O—, —O—CO— and —O—CO—O—;

$R_9$ and $R_{10}$ are the same or different and each independently of one another is selected from linear or branched $(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl;
$R_{11}$ is selected from substituted or unsubstituted $(C_1-C_6)$alkylene, $(C_6-C_{10})$arylene $(C_6-C_{10})$aryl$(C_2-C_6)$alkylene and $(C_2-C_6)$alkyl$(C_6-C_{10})$arylene;
remaining one or more of $R_5$, $R_6$, $R_7$ and $R_8$ independently represents hydrogen, linear or branched $(C_1-C_{12})$alkyl, hydroxy$(C_1-C_{12})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, $(C_5-C_{10})$heteroaryl, $(C_5-C_{10})$heteroaryl$(C_1-C_3)$alkyl, hydroxy, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, and $(C_1-C_6)$acyloxy and halogen;
a monomer of formula (III):

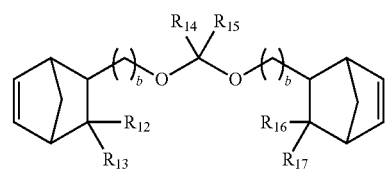

wherein:
b is an integer from 2 to 6;
$R_{12}$, $R_{13}$, $R_{16}$ and $R_{17}$ are the same or different and each independently of one another is selected from hydrogen, linear or branched $(C_1-C_{16})$alkyl, hydroxy$(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, di$(C_1-C_2)$alkylmaleimide$(C_3-C_6)$alkyl, di$(C_1-C_2)$alkylmaleimide$(C_2-C_6)$alkoxy$(C_1-C_2)$alkyl, hydroxy, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, and $(C_1-C_6)$acyloxy, where each of the aforementioned substituents are optionally substituted with a group selected from halogen or hydroxy; and
$R_{14}$ and $R_{15}$ are the same or different and each independently of one another is selected from linear or branched $(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl and perfluoro$(C_6-C_{10})$aryl$(C_1-C_3)$alkyl; and a monomer of formula (IV):

(IV)

wherein:
c is an integer from 2 to 6;
Ar is $(C_6-C_{10})$aryl; and
Z, $R_9$, $R_{10}$ and $R_{11}$ are as defined above; and
an organo-transition metal compound selected from an organo-palladium or an organo-nickel compound; and optionally a chain transfer agent.

15. The composition of claim 14, wherein said organo-transition metal compound is an organo-palladium compound.

16. The composition of claim 15, wherein said organo-transition compound is selected from the group consisting of:
trans-[Pd(NCMe)(OAc)(P(i-propyl)$_3$)$_2$]B$(C_6F_5)_4$,
trans-[Pd(NCC(CH$_3$)$_3$)(OAc)(P(i-propyl)$_3$)$_2$]B$(C_6F_5)_4$,
trans-[Pd(OC(C$_6$H$_5$)$_2$)(OAc)(P(i-propyl)$_3$)$_2$]B$(C_6F_5)_4$,
trans-[Pd(HOCH(CH$_3$)$_2$)(OAc)(P(i-propyl)$_3$)$_2$]B$(C_6F_5)_4$,
trans-[Pd(NCMe)(OAc)(P(cyclohexyl)$_3$)$_2$]B$(C_6F_5)_4$,
Pd(OAc)$_2$(P(cyclohexyl)$_3$)$_2$,
Pd(OAc)$_2$(P(i-propyl)$_3$)$_2$,
Pd(OAc)$_2$(P(i-propyl)$_2$(phenyl))$_2$, and
trans-[Pd(NCMe)(OAc)(P(cyclohexyl)$_2$(t-butyl))$_2$]B $(C_6F_5)_4$, where OAc is OCOCH$_3$.

17. The composition of claim 14, wherein said one or more monomers of formula (I) is selected from the group consisting of:
bicyclo[2.2.1]hept-2-ene (NB);
norbornenyl-2-trifluoromethyl-3,3,3-trifluoropropan-2-ol (HFANB);
5-hexylbicyclo-[2.2.1]hept-2-ene (HexNB);
5-octylbicyclo[2.2.1]hept-2-ene (OctNB);
5-decylbicyclo[2.2.1]hept-2-ene (DecNB);
5-perfluorobutylbicyclo[2.2.1]hept-2-ene (C$_4$F$_9$NB);
5-phenethylbicyclo[2.2.1]hept-2-ene (PENB); and
2-(bicyclo[2.2.1]hept-5-en-2-yl)bicyclo[2.2.1]heptane (NBANB).

18. The composition of claim 14, wherein said monomer of formula (II) is selected from the group consisting of:
2-methylbut-3-en-2-yl bicyclo[2.2.1]hept-5-ene-2-carboxylate;
2-methylpent-4-en-2-yl bicyclo[2.2.1]hept-5-ene-2-carboxylate;
2-methylhex-5-en-2-yl bicyclo[2.2.1]hept-5-ene-2-carboxylate;
2,5-dimethylhept-6-en-2-yl bicyclo[2.2.1]hept-5-ene-2-carboxylate;
2,6-dimethyloct-7-en-2-yl bicyclo[2.2.1]hept-5-ene-2-carboxylate;
3,5,7-trimethylnon-8-en-3-yl bicyclo[2.2.1]hept-5-ene-2-carboxylate;
1,1,1-trifluoro-6-methyl-2-(trifluoromethyl)oct-7-en-2-yl 3-methylbicyclo[2.2.1]hept-5-ene-2-carboxylate; and
2,6-dimethyloct-7-en-2-yl 3,3-dimethylbicyclo[2.2.1]hept-5-ene-2-carboxylate.

19. The composition of claim 14, wherein said monomer of formula (III) is selected from the group consisting of:
5,5'-((propane-2,2-diylbis(oxy))bis(ethane-2,1-diyl))bis(bicyclo[2.2.1]hept-2-ene);
5,5'-((butane-2,2-diylbis(oxy))bis(ethane-2,1-diyl))bis(bicyclo[2.2.1]hept-2-ene);
5,5'-((pentane-3,3-diylbis(oxy))bis(ethane-2,1-diyl))bis(bicyclo[2.2.1]hept-2-ene);
5,5'-(((1-phenylpropane-1,1-diyl)bis(oxy))bis(ethane-2,1-diyl))bis(bicyclo[2.2.1]hept-2-ene);
5,5'-(((1-cyclohexylpropane-1,1-diyl)bis(oxy))bis(ethane-2,1-diyl))bis(bicyclo[2.2.1]hept-2-ene);
6,6'-((propane-2,2-diylbis(oxy))bis(ethane-2,1-diyl))bis(5-methylbicyclo[2.2.1]hept-2-ene);
5,5'-(((perfluoropropane-2,2-diyl)bis(oxy))bis(ethane-2,1-diyl))bis(bicyclo[2.2.1]hept-2-ene);
5,5'-((propane-2,2-diylbis(oxy))bis(propane-3,1-diyl))bis(bicyclo[2.2.1]hept-2-ene); and
5,5'-((propane-2,2-diylbis(oxy))bis(butane-4,1-diyl))bis(bicyclo[2.2.1]hept-2-ene).

20. The composition of claim 14, wherein said monomer of formula (IV) is selected from the group consisting of:
bis(2,6-dimethyloct-7-en-2-yl) terephthalate;
tris(2,6-dimethyloct-7-en-2-yl) benzene-1,3,5-tricarboxylate;
tetrakis(2,6-dimethyloct-7-en-2-yl) benzene-1,2,4,5-tetracarboxylate; and
tetrakis(2,6-dimethyloct-7-en-2-yl) naphthalene-2,3,6,7-tetracarboxylate.

21. The composition of claim 14, wherein said chain transfer agent is a compound of formula (IX):

(IX)

wherein
d is an integer from 0 to 4;
e is an integer from 0 to 2a+4;
each R is hydrogen, halogen, methyl, ethyl, linear or branched $(C_3-C_6)$alkyl, substituted or unsubstituted $(C_3-C_7)$cycloalkyl, $(C_6-C_{10})$aryl, $(C_6-C_{10})$aralkyl, methoxy, ethoxy, linear or branched $(C_3-C_6)$alkoxy, substituted or unsubstituted $(C_3-C_7)$cycloalkoxy, $(C_6-C_{10})$aryloxy and $(C_6-C_{10})$aralkyloxy.

22. A flame retardant material comprising the polymer of claim 1.

* * * * *